March 13, 1962 R. J. FIBIKAR ET AL 3,024,661
AUTOMATIC MULTIPLE STATION BALANCING MACHINE
Original Filed July 22, 1955 24 Sheets-Sheet 1

INVENTORS:
Werner I. Senger
Robert J. Fibikar
BY
Andrus & Starke
ATTORNEYS.

March 13, 1962  R. J. FIBIKAR ET AL  3,024,661
AUTOMATIC MULTIPLE STATION BALANCING MACHINE
Original Filed July 22, 1955  24 Sheets-Sheet 2

INVENTORS:
Werner I. Senger
Robert J. Fibikar
BY
Andrew E. Starke
ATTORNEYS.

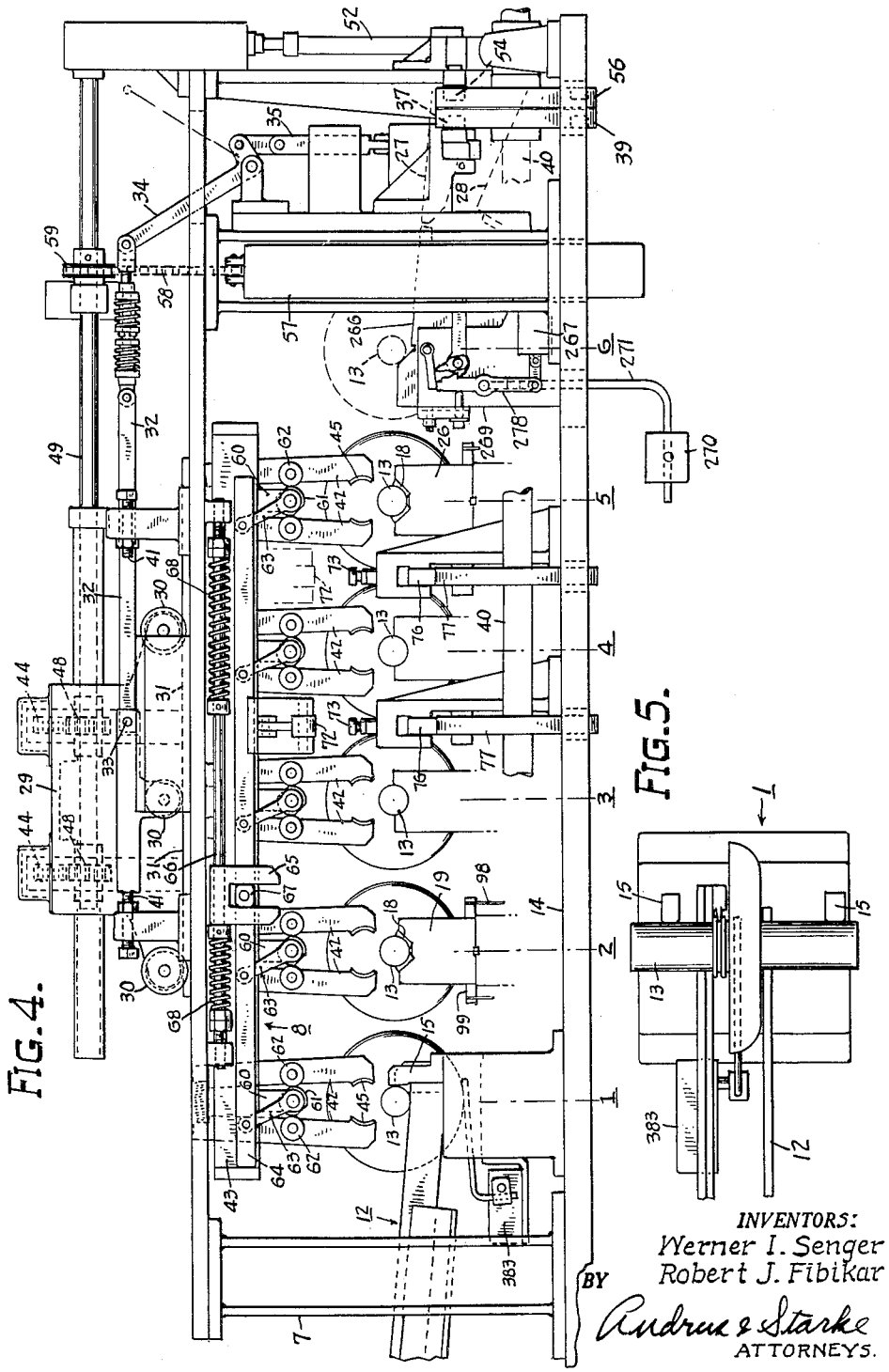

March 13, 1962 R. J. FIBIKAR ET AL 3,024,661
AUTOMATIC MULTIPLE STATION BALANCING MACHINE
Original Filed July 22, 1955 24 Sheets-Sheet 5
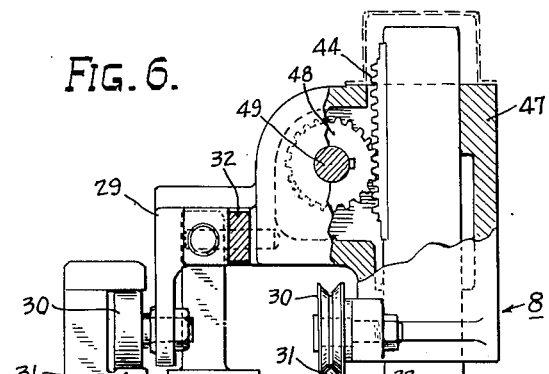
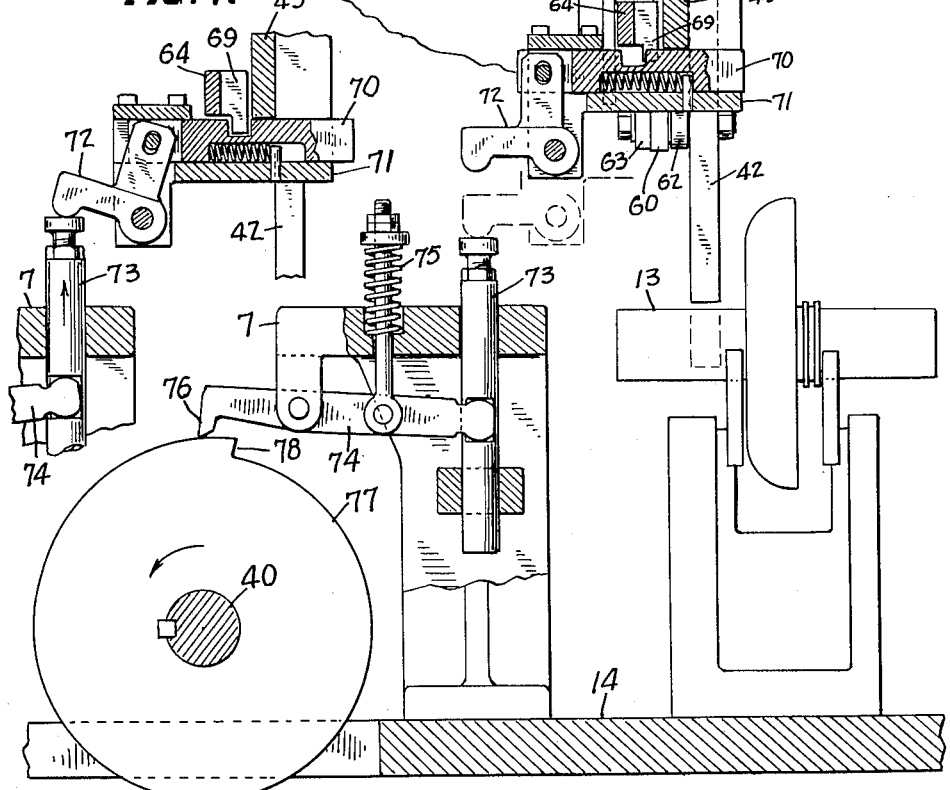
INVENTORS:
Werner I. Senger
Robert J. Fibikar
BY
Andrus & Starke
ATTORNEYS.

March 13, 1962 R. J. FIBIKAR ET AL 3,024,661
AUTOMATIC MULTIPLE STATION BALANCING MACHINE
Original Filed July 22, 1955 24 Sheets-Sheet 6
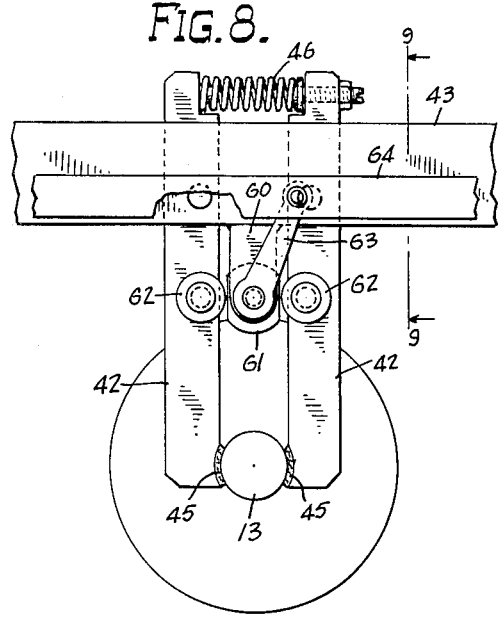
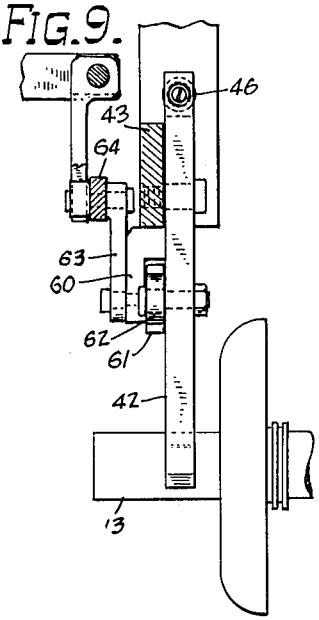
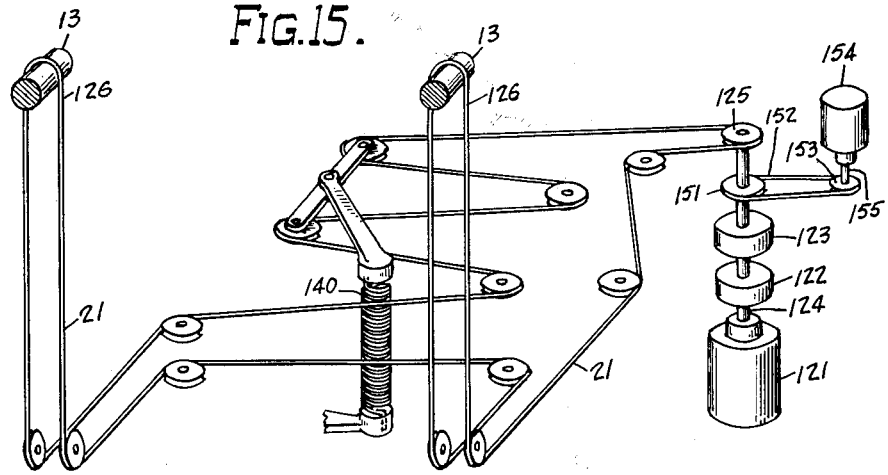
INVENTORS:
Werner I. Senger
Robert J. Fibikar
BY
Andrus & Starke
ATTORNEYS.

March 13, 1962  R. J. FIBIKAR ET AL  3,024,661
AUTOMATIC MULTIPLE STATION BALANCING MACHINE
Original Filed July 22, 1955  24 Sheets-Sheet 7
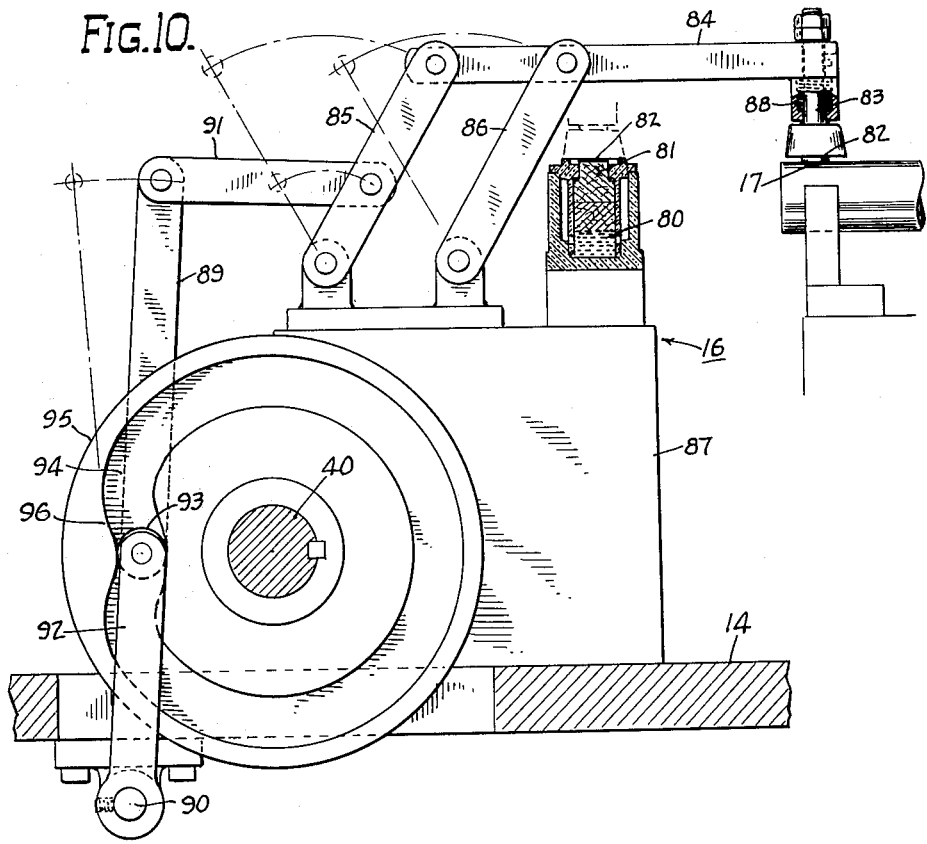
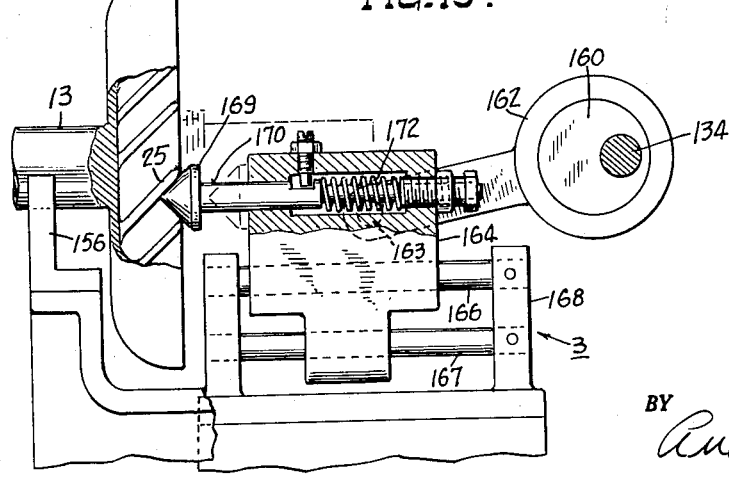
INVENTORS:
Werner I. Senger
Robert J. Fibikar
BY
Andrus & Starke
ATTORNEYS.

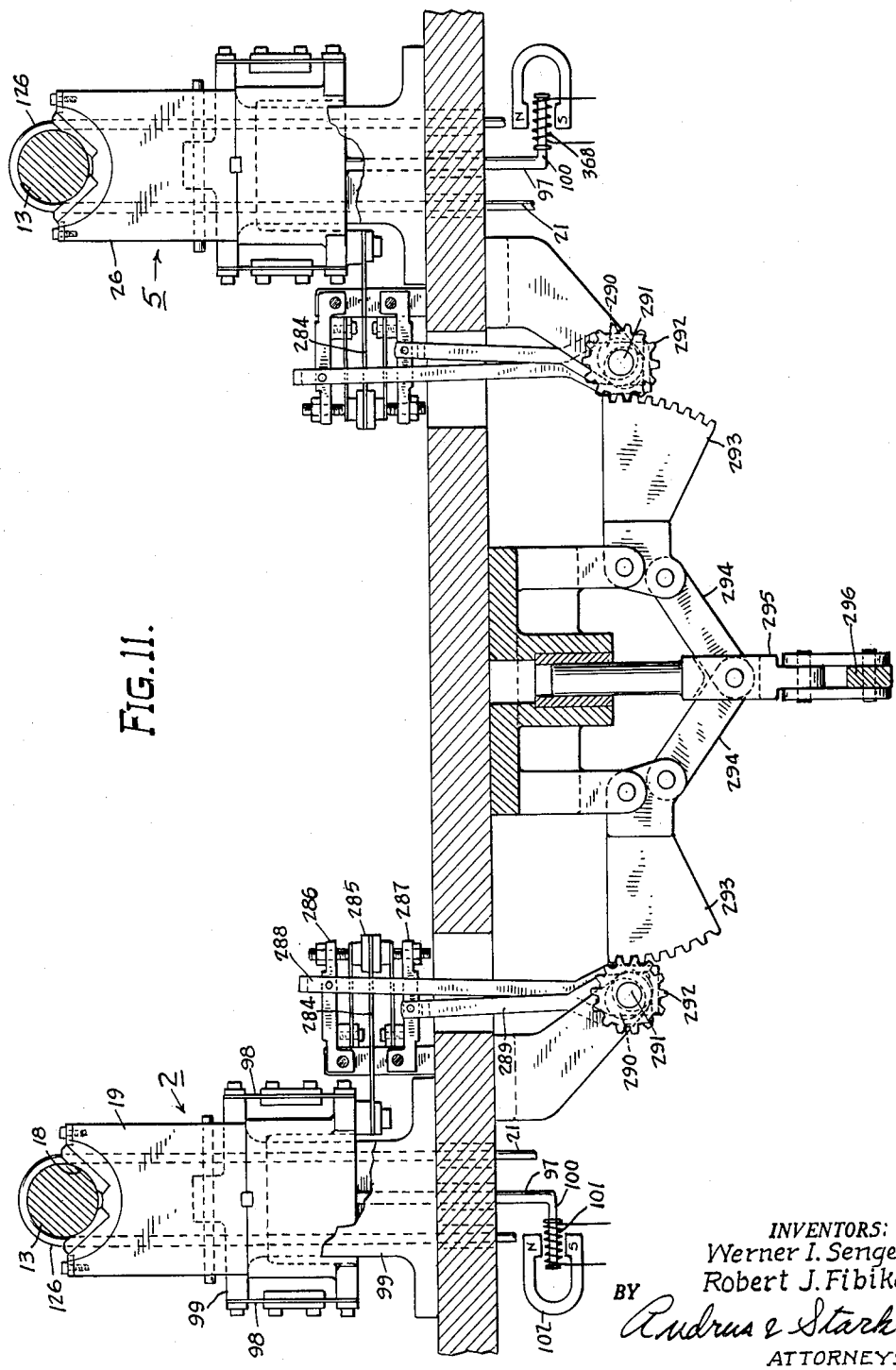

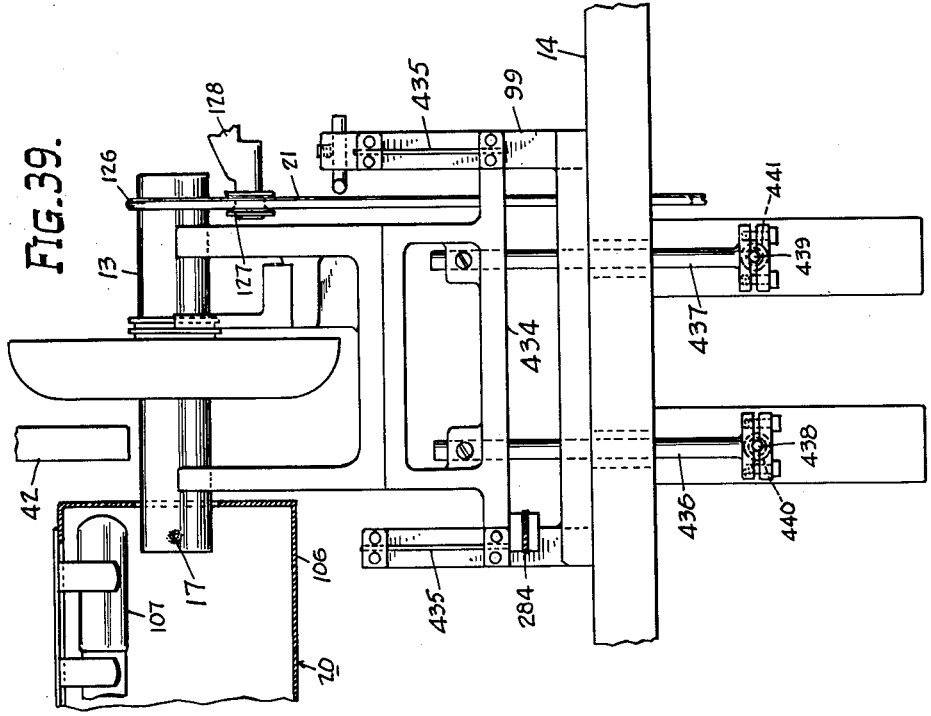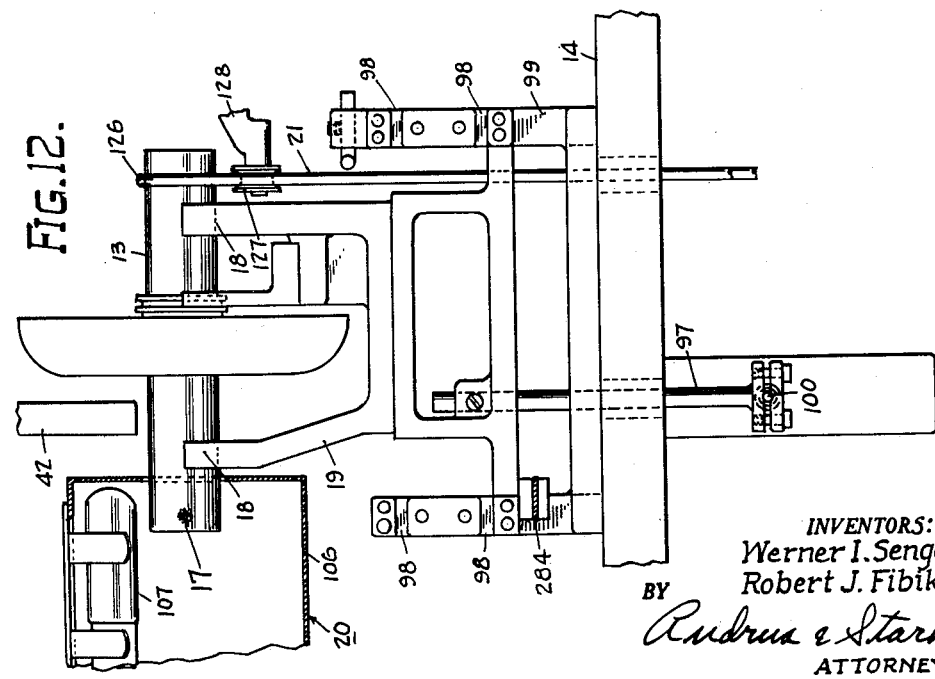

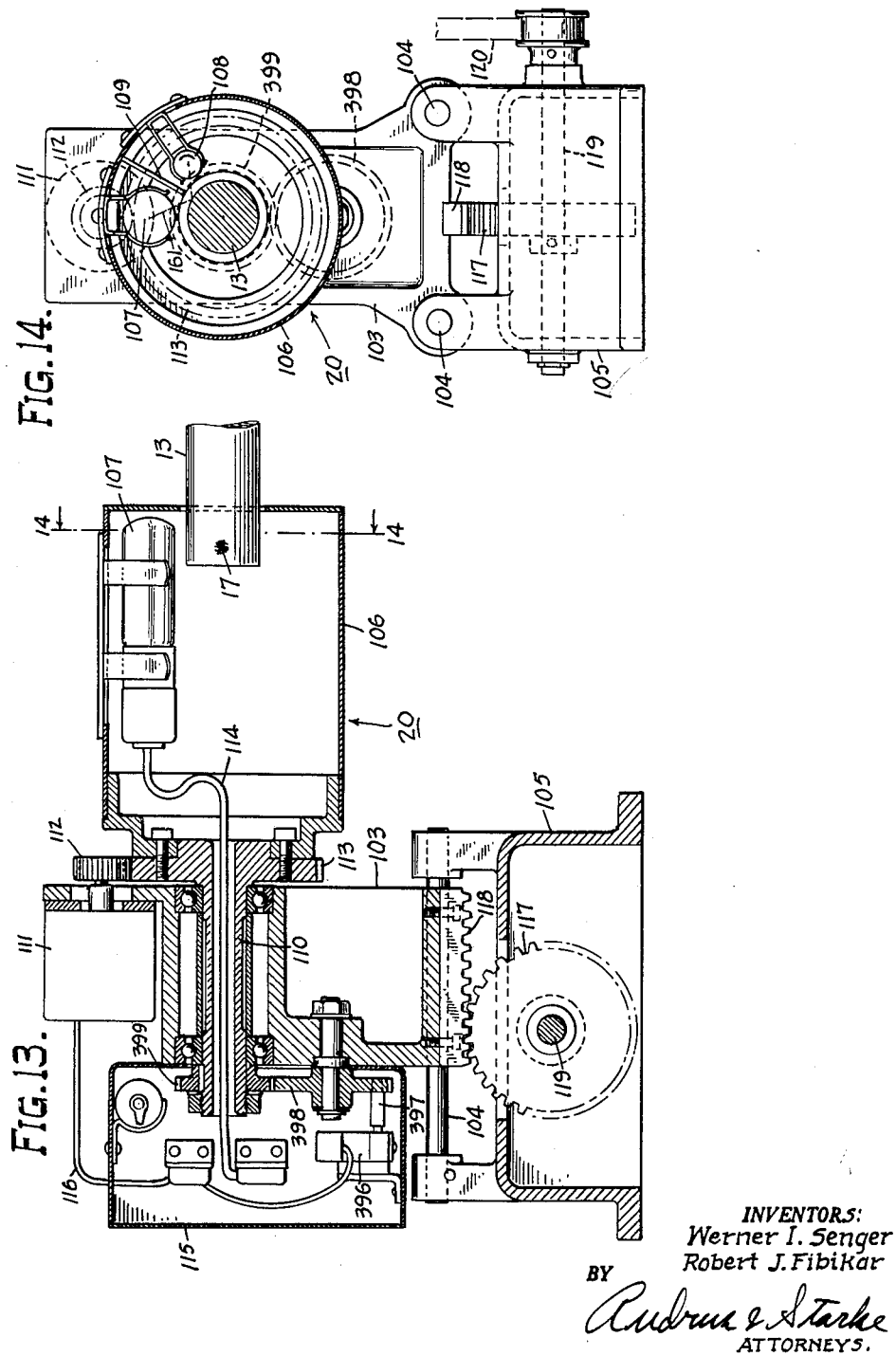

March 13, 1962  R. J. FIBIKAR ET AL  3,024,661
AUTOMATIC MULTIPLE STATION BALANCING MACHINE
Original Filed July 22, 1955  24 Sheets-Sheet 11
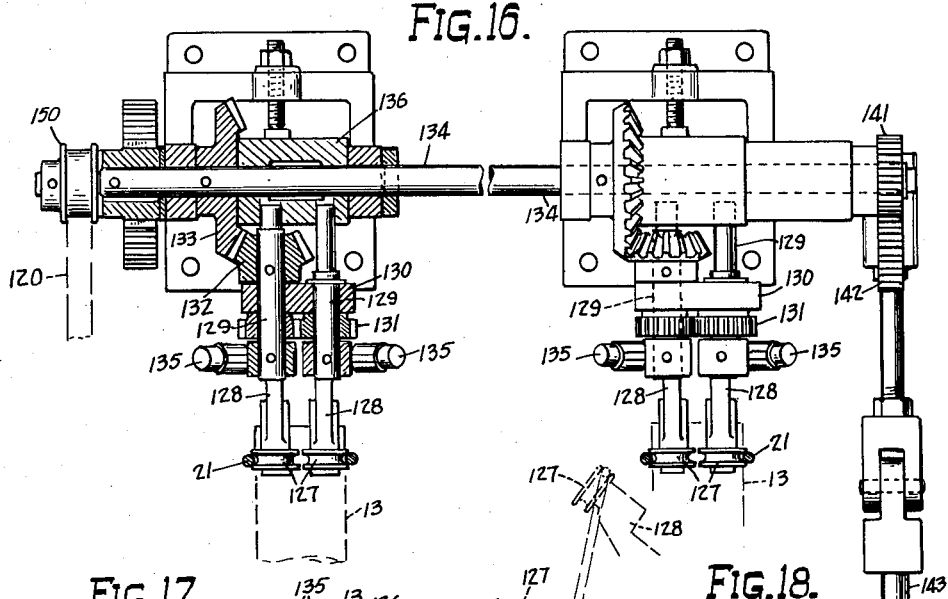
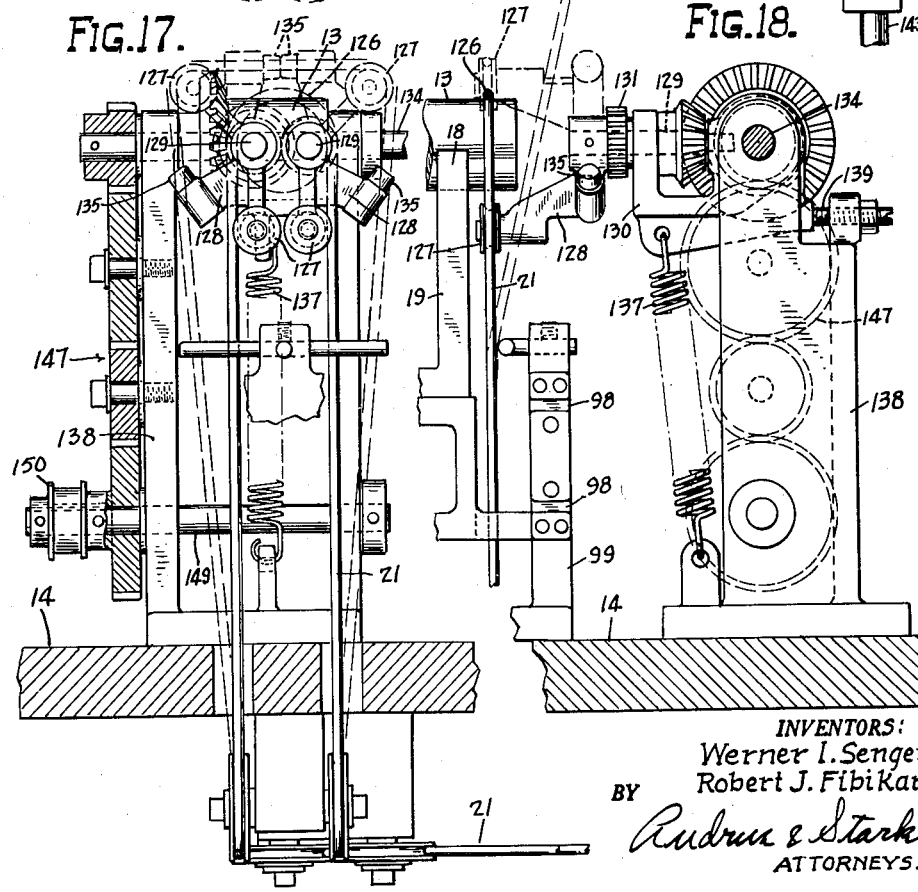
INVENTORS:
Werner I. Senger
Robert J. Fibikar
BY
Andrus & Starke
ATTORNEYS.

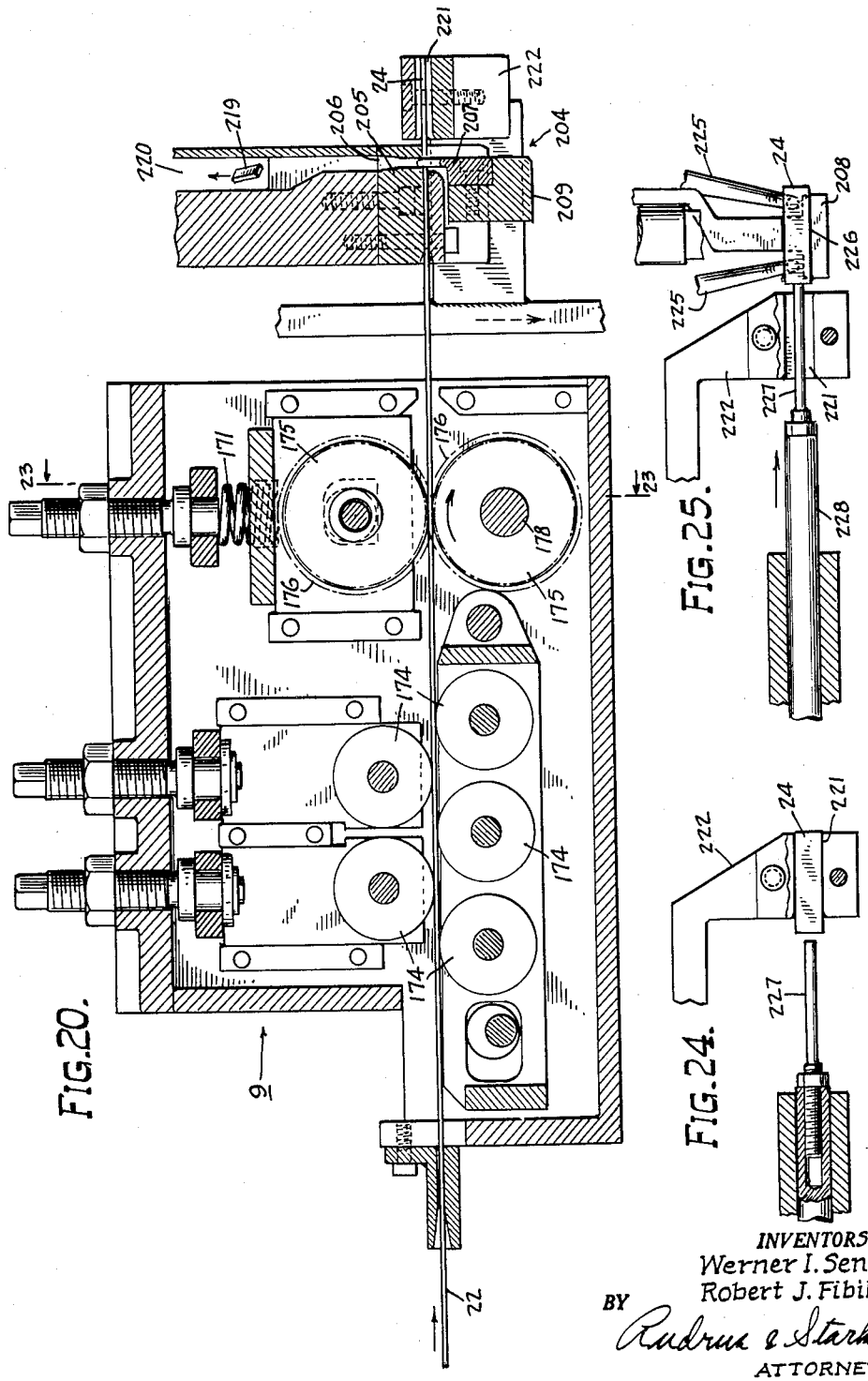

March 13, 1962 — R. J. FIBIKAR ET AL — 3,024,661
AUTOMATIC MULTIPLE STATION BALANCING MACHINE
Original Filed July 22, 1955 — 24 Sheets-Sheet 13

INVENTORS:
Werner I. Senger
Robert J. Fibikar
BY Andrus & Starke
ATTORNEYS.

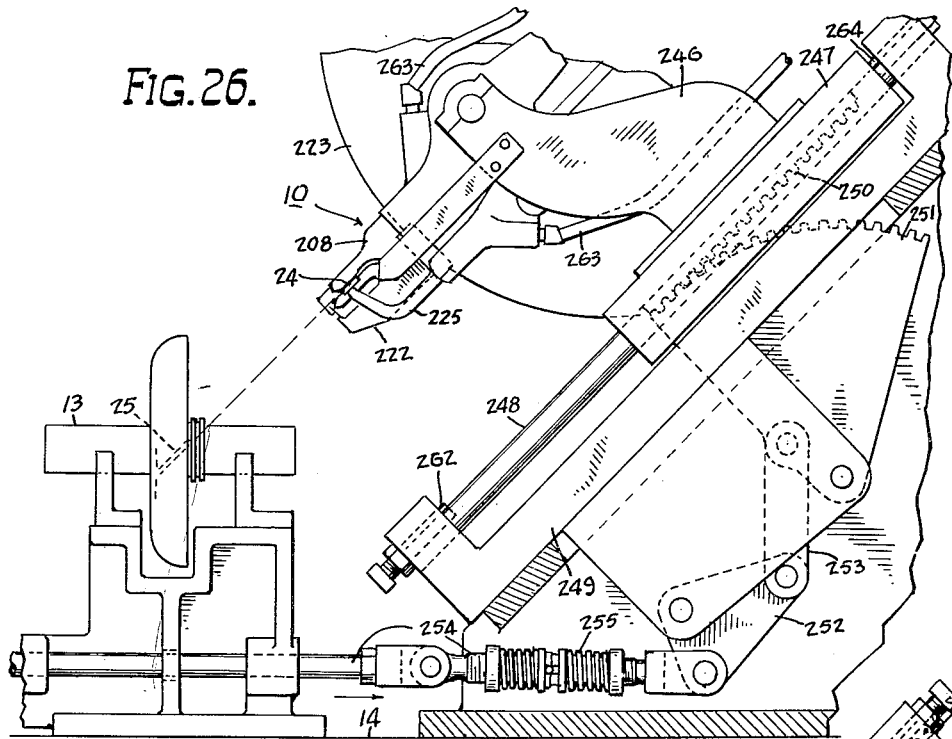
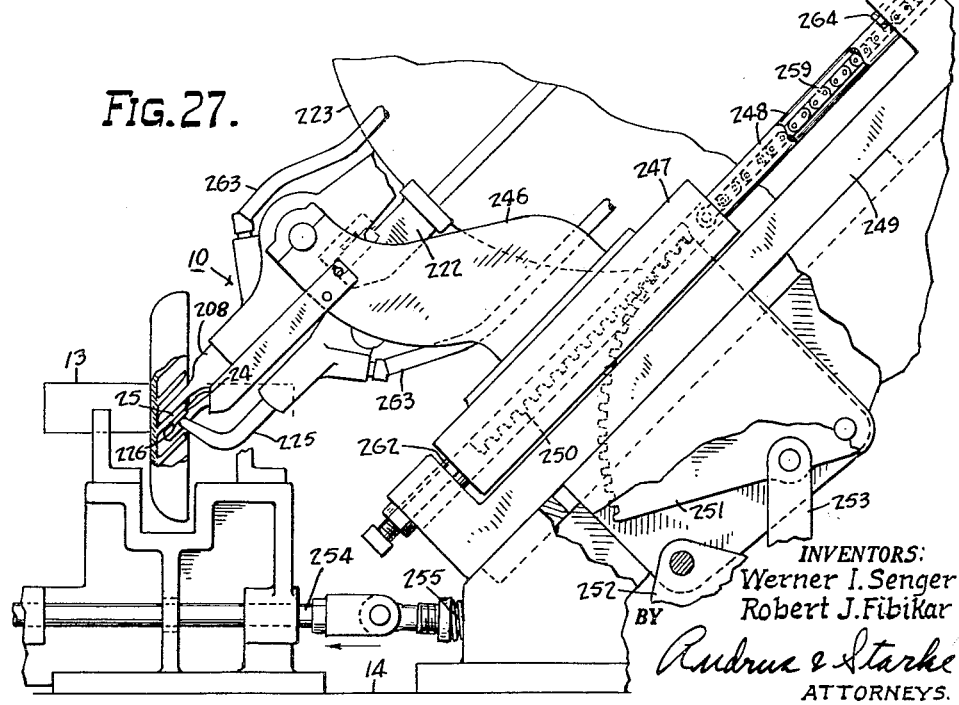

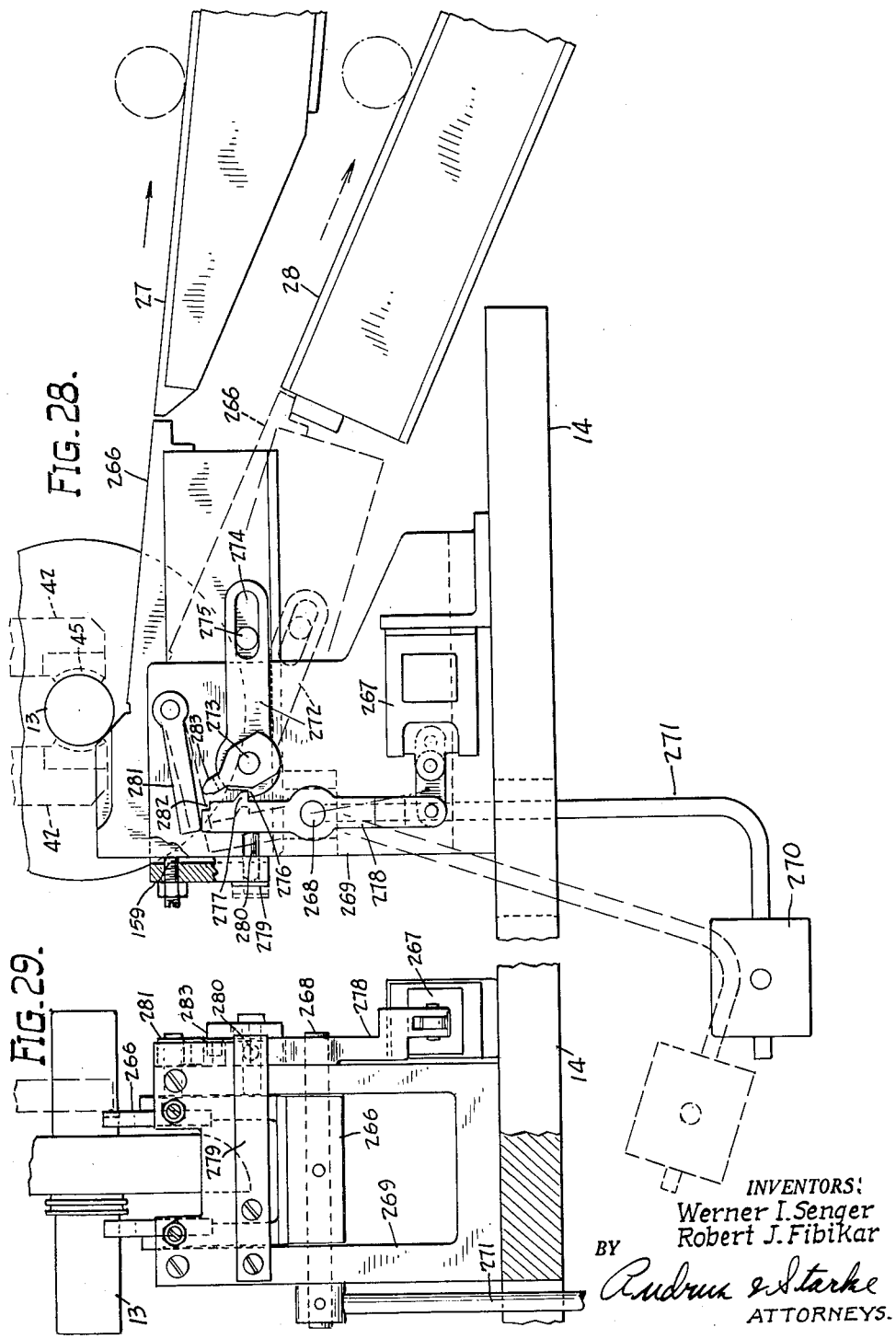

March 13, 1962 R. J. FIBIKAR ET AL 3,024,661
AUTOMATIC MULTIPLE STATION BALANCING MACHINE
Original Filed July 22, 1955 24 Sheets-Sheet 16

INVENTORS:
Werner I. Senger
Robert J. Fibikar
BY
Andrus & Starke
ATTORNEYS.

March 13, 1962  R. J. FIBIKAR ET AL  3,024,661

AUTOMATIC MULTIPLE STATION BALANCING MACHINE

Original Filed July 22, 1955  24 Sheets-Sheet 17

INVENTORS:
Werner I. Senger
Robert J. Fibikar
BY
*Andrus & Starke*
ATTORNEYS.

March 13, 1962  R. J. FIBIKAR ET AL  3,024,661
AUTOMATIC MULTIPLE STATION BALANCING MACHINE
Original Filed July 22, 1955  24 Sheets-Sheet 18

INVENTORS:
Werner I. Senger
Robert J. Fibikar
BY
ATTORNEYS.

March 13, 1962  R. J. FIBIKAR ET AL  3,024,661
AUTOMATIC MULTIPLE STATION BALANCING MACHINE
Original Filed July 22, 1955  24 Sheets-Sheet 19

INVENTORS:
Werner I. Senger
Robert J. Fibikar
BY
Andrus & Starke
ATTORNEYS.

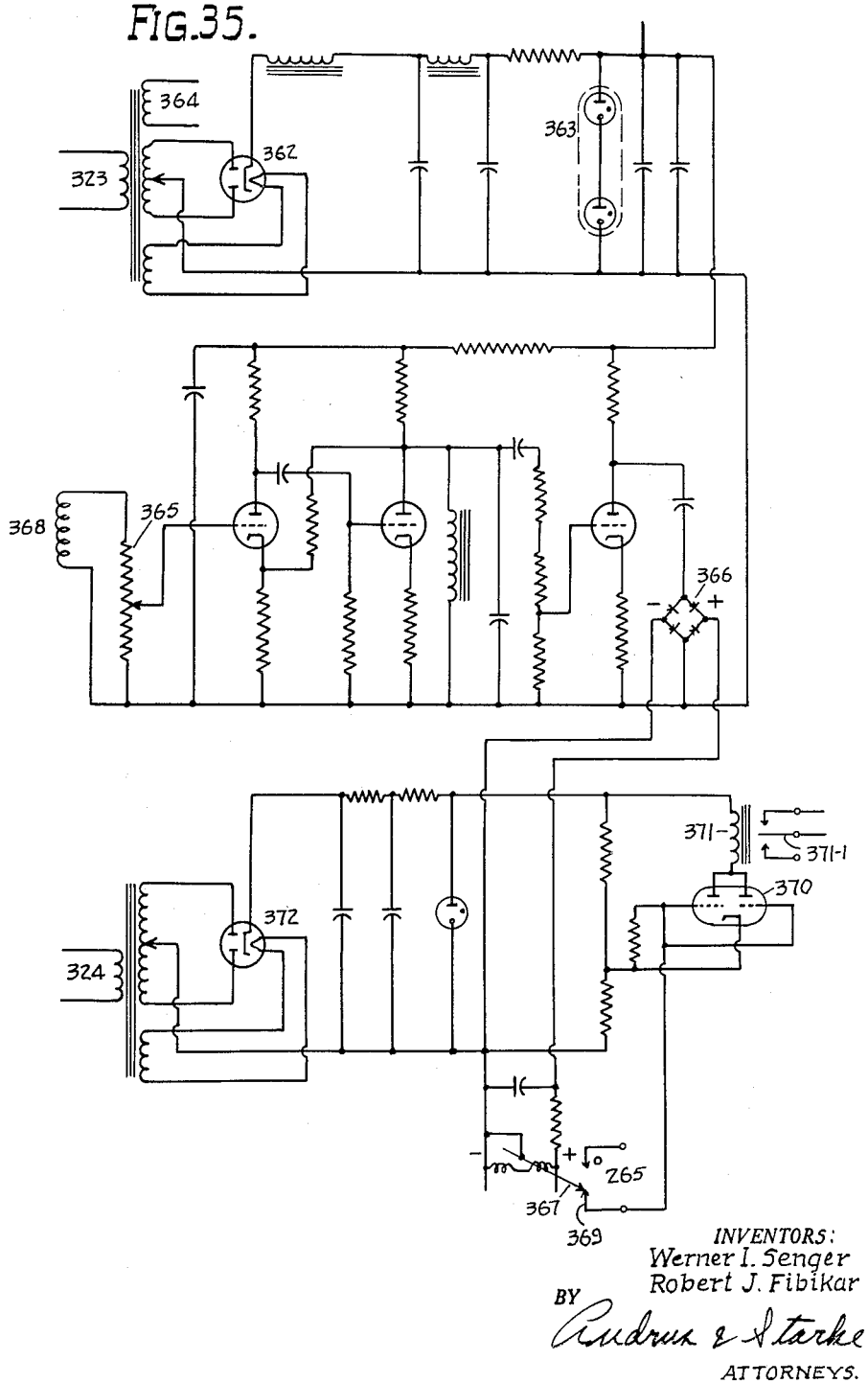

March 13, 1962 R. J. FIBIKAR ET AL 3,024,661
AUTOMATIC MULTIPLE STATION BALANCING MACHINE
Original Filed July 22, 1955 24 Sheets-Sheet 21
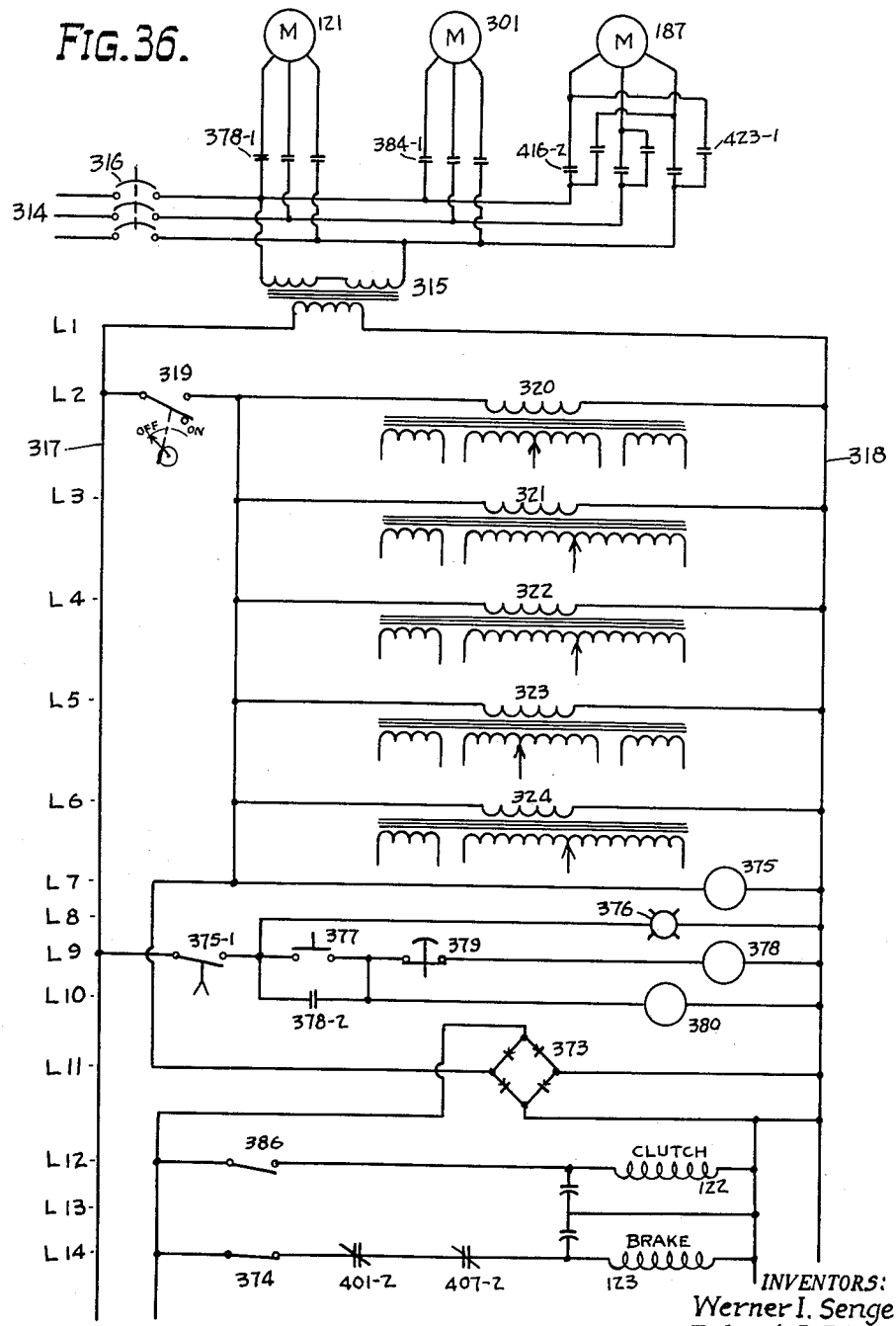
INVENTORS:
Werner I. Senger
Robert J. Fibikar
BY Andrus & Starke
ATTORNEYS.

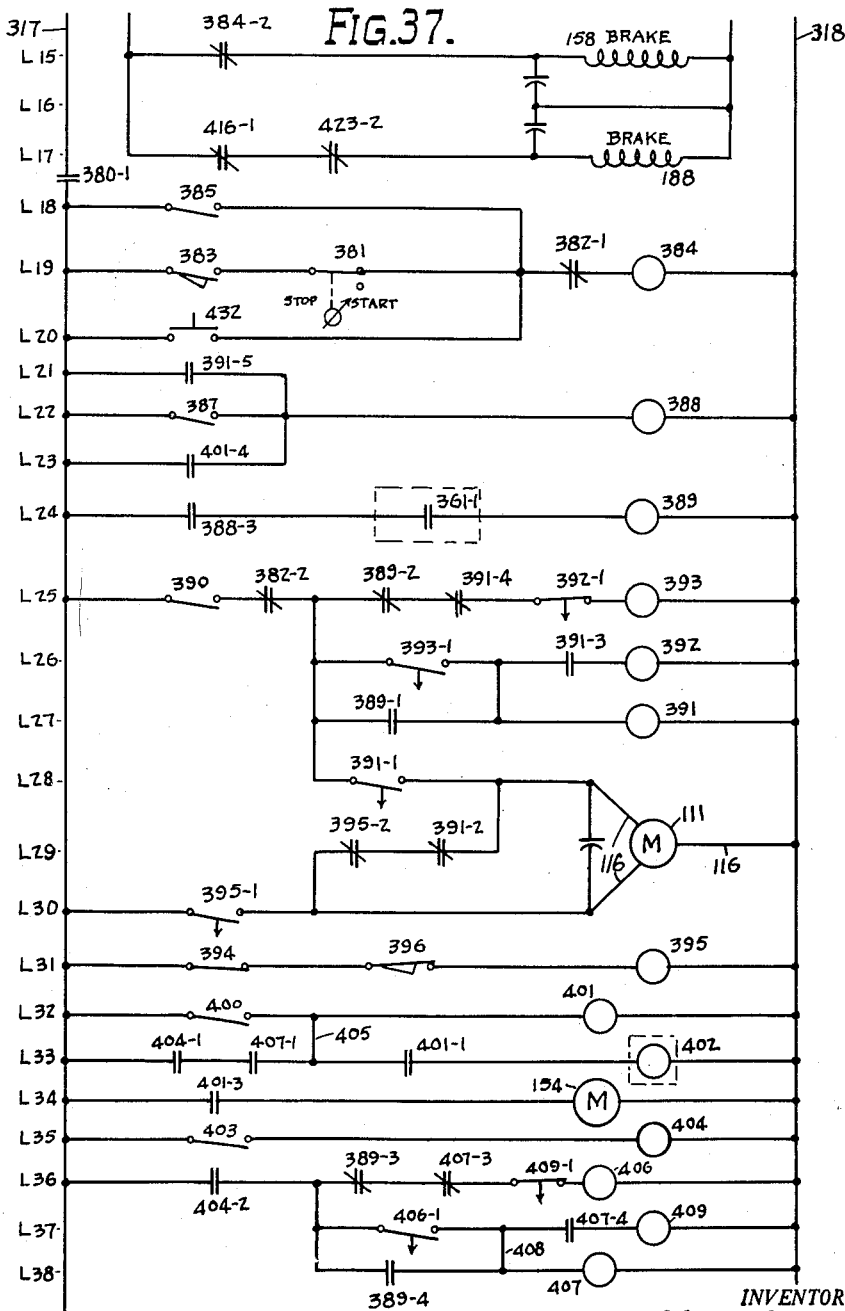

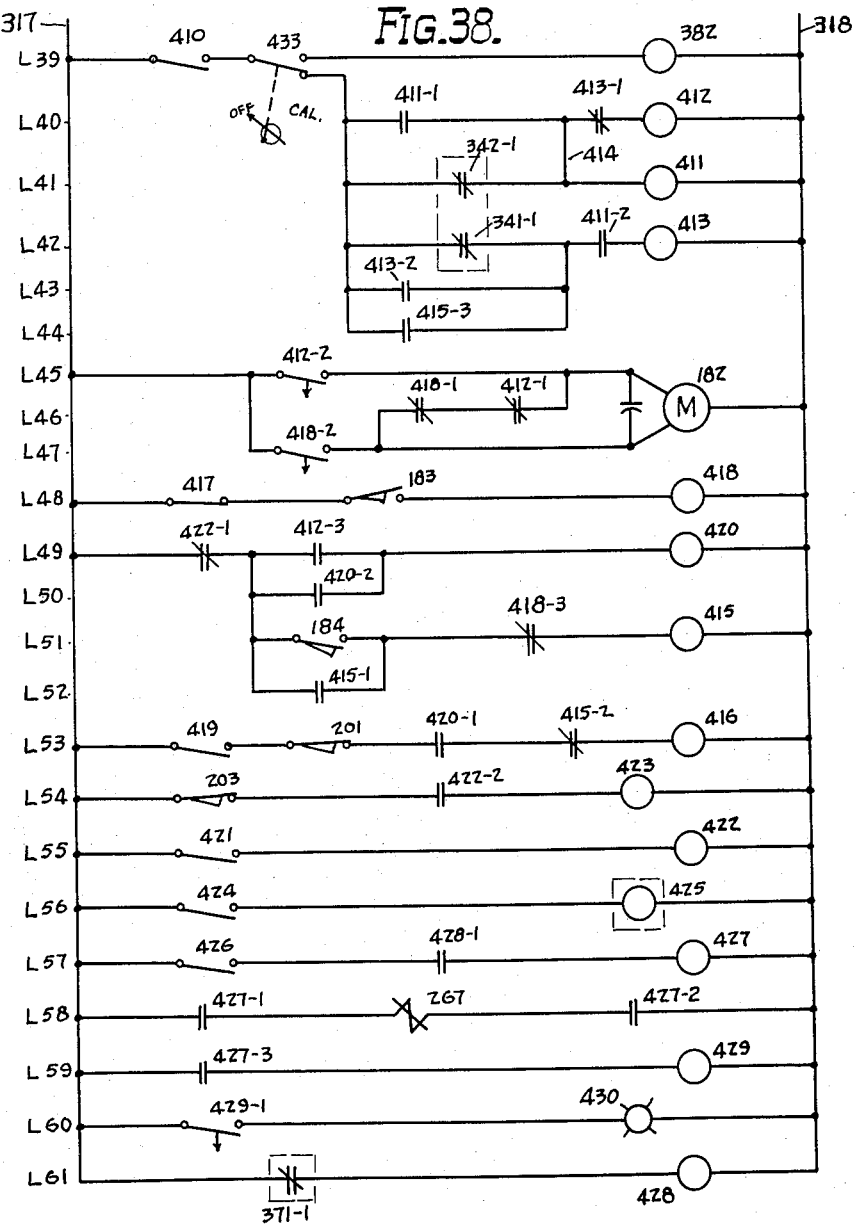

March 13, 1962 R. J. FIBIKAR ET AL 3,024,661
AUTOMATIC MULTIPLE STATION BALANCING MACHINE
Original Filed July 22, 1955 24 Sheets-Sheet 24
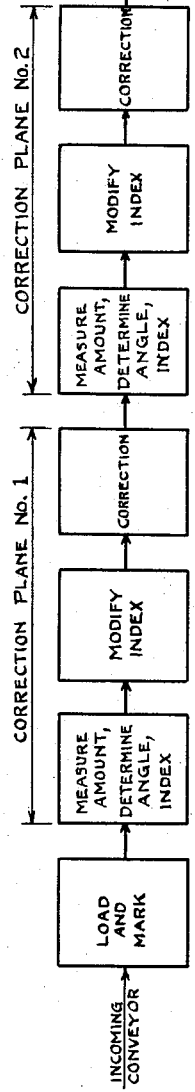
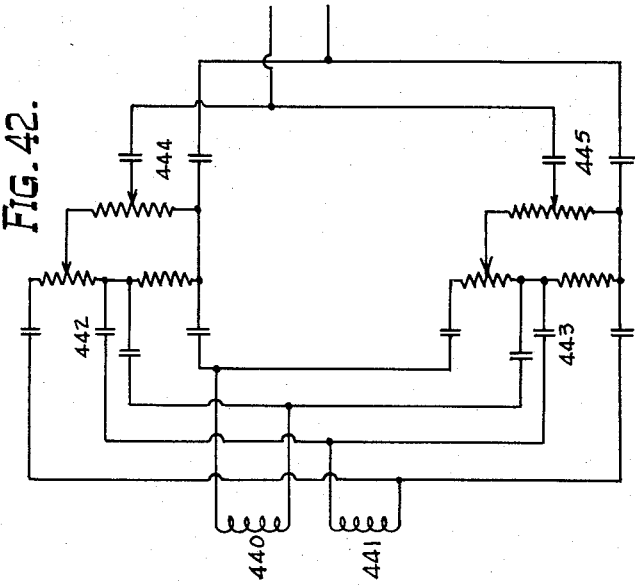
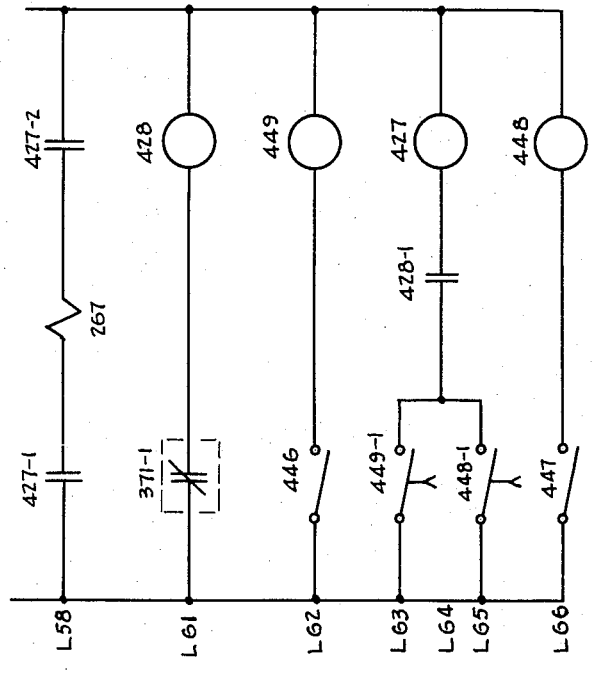
INVENTORS:
Werner I. Senger
Robert J. Fibikar
BY
Andrus & Starke
ATTORNEYS.

United States Patent Office 3,024,661
Patented Mar. 13, 1962

3,024,661
AUTOMATIC MULTIPLE STATION BALANCING MACHINE
Robert J. Fibikar and Werner I. Senger, Madison, Wis., assignors to Gisholt Machine Company, Madison, Wis., a corporation of Wisconsin
Original application July 22, 1955, Ser. No. 523,904. Divided and this application Jan. 23, 1958, Ser. No. 710,699
5 Claims. (Cl. 73—466)

This invention relates to an automatic multiple station balancing machine.

This application is a division of the inventors' copending application Serial No. 523,904, filed July 22, 1955, and entitled "Automatic Multiple Station Balancing Machine."

The invention utilizes some of the general principles of the balancing machine set forth in United States Letters Patent No. 2,243,379, granted to George H. Johnson on May 27, 1941, and also the invention set forth in application for United States Letters Patent Serial No. 514,985, filed by the present inventors on June 13, 1955.

The machine of the present invention has a greater capacity than a single station machine such as that described and claimed in the application referred to above. For instance, the actual time cycle per piece from a machine production standpoint is the actual time required for the operations performed at the slowest station plus the time of load and unload for that station, although the time cycle for any given workpiece will be a multiple of that generally corresponding to the number of stations in the machine.

By dividing the several operations into given time cycles it is possible to provide the requisite number of stations to carry out all of the operations on separate workpieces at one time, thereby substantially shortening the overall machine cycle. Each operation is made fully automatic and a common drive effects a correlation that completes the balance correction of each workpiece in accordance with unbalance intelligence obtained as to such piece in a previous cycle of operation.

The machine entirely eliminates errors due to the operator since no operator is necessary. Instead, the machine is automatically shut down in case of error in final inspection and a signal is established. For this purpose the machine can utilize the invention described and claimed in copending application Serial No. 514,961, filed June 13, 1955 by Robert J. Fibikar, one of the present joint inventors, now Patent No. 2,986,920.

In carrying out the invention each workpiece entering the machine passes through the operations at each station and is finally discharged from the machine either on a line of finished product or on a line for rejects, depending upon whether the workpiece is balanced within a predetermined tolerance limit for unbalance or not.

Where the production line feeding workpieces to the machine may contain a substantial number of workpieces having a balance substantially within the tolerance limit for unbalance, the successive workpieces should be inspected ahead of the present machine as by apparatus set forth and claimed in copending application Serial No. 471,627, filed November 29, 1954, by Werner I. Senger, now abandoned; and application Serial No. 479,196, filed December 31, 1954, by Robert J. Fibikar, now Patent No. 2,891,241, the present inventors.

The machine of the present invention utilizes the principles of unbalance angle determination and workpiece index set forth and claimed in copending application Serial No. 468,397, filed November 12, 1954, by Werner I. Senger, now Patent No. 2,944,424.

The accompanying drawings illustrate an embodiment of the present invention constituting the best mode of carrying out the invention as presently contemplated.

In the drawings:

FIG. 4 is a detail elevation showing the transfer mechanism for moving workpieces from station to station;

FIG. 5 is an enlarged plan detail of the first or loading station;

FIG. 6 is an enlarged detail section showing the shift mechanism and release for the transfer;

FIG. 7 is a detail showing the release mechanism in actuated position;

FIG. 8 is an enlarged detail showing a gripper closed upon the workpiece for transfer of the latter;

FIG. 9 is a detail view taken on line 9—9 of FIG. 8;

FIG. 10 is an enlarged detail transverse section showing the marking device at the loading station;

FIG. 11 is an enlarged front view of the unbalance measuring and unbalance inspection stations;

FIG. 12 is a side elevation of the cradle mounting at stations shown in FIG. 11;

FIG. 13 is a vertical section through the angle determining device at station 2;

FIG. 14 is a section taken on line 14—14 of FIG. 13;

FIG. 15 is a schematic showing of the belt drive for the workpiece at the unbalance measuring and unbalance inspection stations;

FIG. 16 is a detail plan view partially in section showing the belt lifters for the unbalance measuring and unbalance inspection stations;

FIG. 17 is a front view with parts in section of the belt lifter for the unbalance measuring station;

FIG. 18 is a right side elevation of the belt lifter of FIG. 17 with the base sectioned;

FIG. 19 is a detail view partially sectioned showing the index adjusting device at an intermediate station;

FIG. 20 is a horizontal section through the strip feeder box and shear mechanism;

FIG. 24 is a detail showing the correction mass transfer head with the poker in retracted position;

FIG. 25 is a view similar to FIG. 24 showing actuation of the poker to deliver a correction mass to the welder;

FIG. 26 is an enlarged side elevation of the welder carriage in raised position for loading as in FIG. 25;

FIG. 27 is a view similar to FIG. 26 showing the welder carriage lowered to welding position with the correction mass applied to the work;

FIG. 28 is a detail elevation of the unloading station showing the reject mechanism;

FIG. 29 is an end view of a part of FIG. 28;

FIG. 31 is a typical time chart for the cycle sequences;

FIG. 35 is a circuit diagram showing the amplifier and inspection circuits for the unbalance inspection station;

FIG. 36 is the starting portion of the control circuit for the machine;

FIG. 37 is a portion of the control circuit continuing from FIG. 36;

FIG. 38 is the end portion of the control circuit continuing from FIG. 37;

FIG. 39 is a view similar to FIG. 12 showing the cradle construction for the measuring and inspection stations where two plane correction and inspection is employed;

FIG. 40 is a flow diagram for a balancing machine employing two plane correction;

FIG. 41 is a control circuit diagram showing a modification of a part of FIG. 38 for two plane inspection; and FIG. 42 is a network diagram for two plane inspection.

Figure 1:
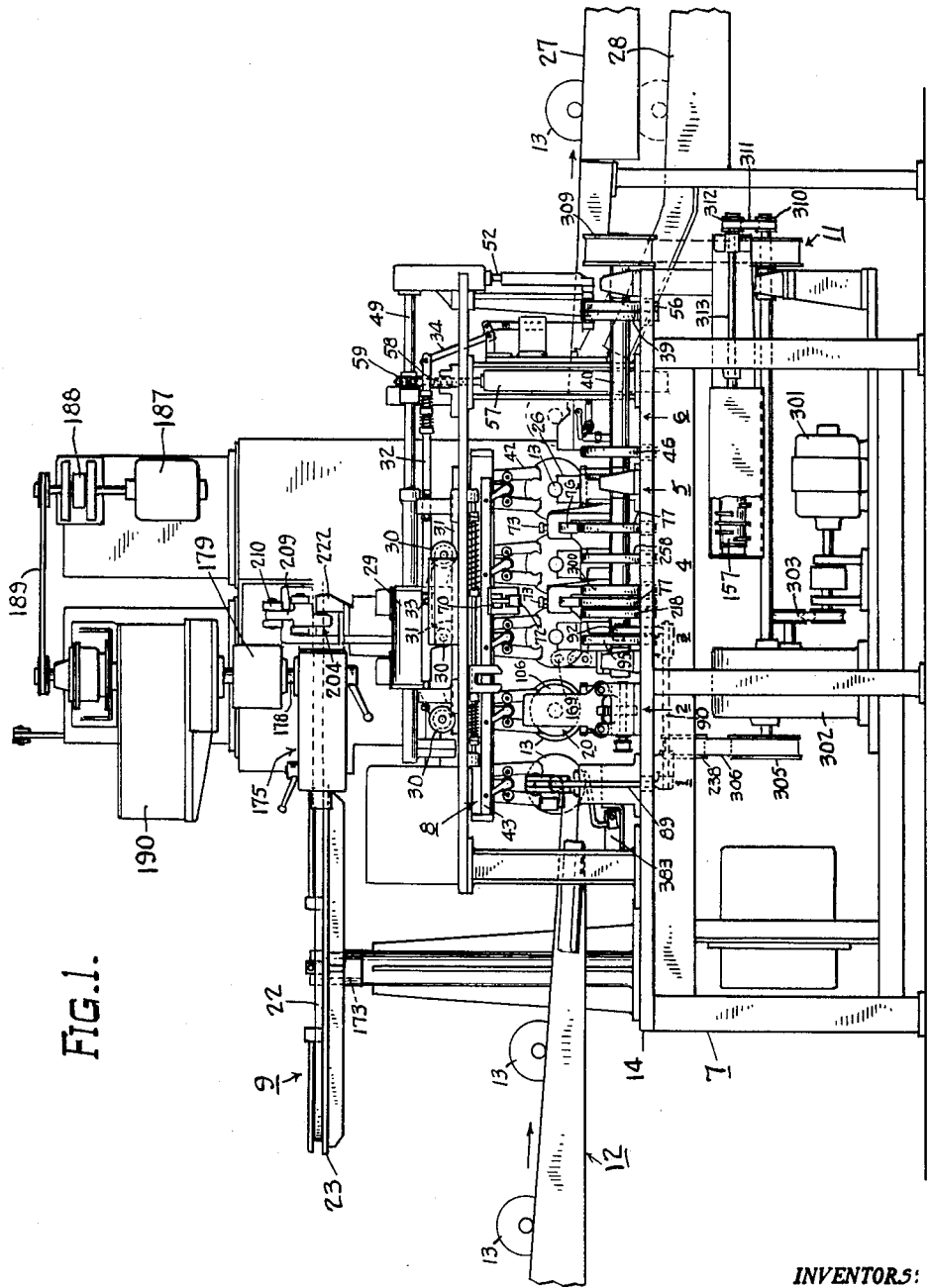
FIGURE 1 is a front elevation of the machine.

The machine illustrated is adapted to correct for unbalance in rotary torque converter parts having blades or vanes in a housing. The correction is made by welding a metal piece onto one side of the blade nearest to the determined point of correction need. For this purpose an extra station is provided to re-index the workpiece to present the nearest blade for correction after first indexing the workpiece accurately with respect to the point of correction. Where no such re-index is needed the extra station may be eliminated.

The machine is adapted for either one plane correction as in static balancing or for two plane correction as in dynamic balancing. FIGURES 1 to 38, inclusive, show the machine as employed for single plane correction. FIGS. 31 and 39 to 42, inclusive, show the general modifications required in the machine for two plane correction. In addition to these modifications it will be generally necessary to duplicate the measuring, indexing and correcting stations, and to duplicate the control circuits therefor represented by section 2 of the time cycle chart in FIG. 31.

The machine as shown in FIGS. 1 to 30 comprises six stations, 1, 2, 3, 4, 5 and 6, frame 7 supporting the mechanism at the stations, transfer mechanism 8, stock supply mechanism 9, welding mechanism 10 and suitable drives therefor including the main drive 11.

An incoming conveyor 12 comprises a pair of parallel inclined rails adjustably spaced apart to fit the hub of a workpiece 13 and to guide the latter as it rolls by gravity into the machine. The lower ends of rails 12 are supported on the top plate 14 of frame 7.

As the workpiece 13 reaches a pair of upstanding stops 15 it is thereby located at the first station 1. In station 1 a marker mechanism 16 is actuated to place a mark 17 on the outer surface of the shaft of the workpiece 13 near one end. The mark 17 may be either light or dark relative to the metal surface of the workpiece shaft, that illustrated herein being dark, to provide a contrast in light reflection as the shaft rotates.

The transfer mechanism 8 then lowers and grips the workpiece 13, raises and moves over to lower the workpiece into station 2, after which the mechanism releases the workpiece, raises and returns to its starting position.

In station 2, the shaft ends of workpiece 13 are supported in bearings 18 on a cradle 19 with the shaft ends of the workpiece extending beyond the cradle bearings as shown. An unbalance angle determining device 20 is moved over the end of the workpiece shaft having mark 17, and a drive belt 21 is lowered onto the opposite end of the workpiece shaft to drive the workpiece.

The workpiece 13 is rotated at station 2 and its unbalance vibrations effect vibration of cradle 19 from which the amount and angle of unbalance is determined. Following this determination the workpiece is indexed angularly to position the same for later correction.

The amount of determined unbalance is employed to determine the feed of strip stock 22 from a reel 23 and shearing from the strip an accurate length piece 24 to be welded to a blade or vane of the workpiece for correcting unbalance. The workpiece is then transferred to station 3 where the index position of the workpiece 13 is corrected to bring the blade 25 of the workpiece nearest to the point of correction directly to that point, as shown in FIG. 19, for later welding.

The workpiece is then transferred to station 4 where the welding mechanism 10 applies the strip piece 24 to one side of blade 25 and welds the piece to the blade.

The workpiece 13 is then transferred to station 5 where it is rotated on a cradle 26 and it is inspected for unbalance to determine whether its remaining unbalance exceeds the tolerance limit for unbalance.

The workpiece is then transferred to station 6 where it rests on a pair of outgoing conveyor rails 27 inclined to provide for downward rolling of the workpiece by gravity out of and away from the machine. In the event the unbalance in the workpiece exceeds the tolerance limit for unbalance as determined at the inspection station 5 the upper ends of rails 27 are pivoted down to drop the workpiece when it is lowered into station 6 onto a pair of rails 28 beneath rails 27 and which constitute a reject conveyor for those workpieces that need further correction.

After six workpieces enter the machine there will always be six workpieces in the machine, one at each station, until the end of a run.

The transfer of workpieces between the stations is accomplished simultaneously by the mechanism 8 which comprises in general a reciprocal carriage 29 having rollers 30 riding on the fixed tracks 31 extending as a part of frame 7 longitudinally in front of the machine and above the several stations 1 to 6, inclusive.

The carriage 29 is reciprocated longitudinally on track 31 by means of a push rod 32 having one end pivoted thereto at 33 and the other end carried by the upper end of the long arm of a pivoted bell crank lever 34. The short arm of lever 34 is actuated by a vertical push rod 35 which is raised or lowered by suitable lever mechanism 36 actuated by cam follower 37 riding in a cam groove 38 of horizontal lifter cam disc 39 on the cam shaft 40 of main drive 11. A pair of adjustable stops 41 determine the ends of the movement stroke for carriage 29.

Five sets of grippers 42 pivotally depend from a lifter bar 43 which in turn is suspended from carriage 29 by means of a pair of vertically movable racks 44. The grippers 42 are arranged in pairs which are spaced apart a distance corresponding to the center line spacing of the stations 1 to 6, inclusive.

Each pair of grippers 42 have felt or cushion pads 45 at their lower ends to grip the polished shaft of each successive workpiece 13 without injuring the same when the grippers are closed together like a jaw upon the shaft. The upper ends of grippers 42 extend beyond the pivotal support therefor and have a compression spring 46 disposed therebetween for biasing the grippers under a substantial force toward work gripping position.

The lifter bar 43 is first lowered and then raised at each end of the horizontal movement of carriage 29. For this purpose the racks 44 are disposed in cylindrical guides 47 and mesh with drive gears 48 which are axially movable on a spline shaft 49 extending parallel to the line of movement for carriage 29.

The spline shaft 49 is fixed against longitudinal reciprocation and carries a pinion 50 meshing with a gear segment 51. The gear segment 51 is rotationally oscillated by a vertical push rod 52 pivoted thereto at its upper end and to an actuating lever 53 at its lower end.

Lever 53 is pivoted to a bracket on frame 7 and carries a cam follower 54 at its end opposite to the pivotal connection with push rod 52. The cam follower 54 rides in a cam groove 55 in the face of vertical lift cam disc 56 adjacent to cam disc 39 on shaft 40.

The cam grooves 38 and 55 are so constructed relative to the mechanism actuated thereby as to effect lowering and raising of lifter bar 43 at each end of the horizontal reciprocal movement of carriage 29, as previously stated.

The weight of lifter bar 43 and all parts connected therewith and of a part of the workpieces to be transferred thereby is counter balanced by a weight 57 suspended in a column of frame 7 by means of a chain 58 or other suitable means passing around and attached to a pulley 59 on shaft 49.

When the grippers 42 are lowered to pick up workpieces they are closed upon the corresponding workpiece shafts and maintained closed until they transfer the several workpieces to the corresponding next stations at which the grippers are opened to release the workpieces and then lifted out of the way.

For this purpose the lifter bar 43 carries a depending bracket 60 disposed between the grippers 42 of each pair of grippers. A cam 61 is rotationally mounted in suitable bearings in the lower end of each bracket 60. Each cam 61 is disposed between a pair of rollers 62 carried by the corresponding pair of grippers.

The cams 61 are rotationally oscillated to either move the corresponding rollers 62 apart or permit them to move toward each other under pressure from springs 46 whereby the gripper jaws are opened and closed.

For this purpose the shaft of each cam 61 is secured to one end of an actuating crank arm 63. The other end of each crank arm 63 is pivoted to an escapement bar 64 carried by the several crank arms and which is adapted to move with lifter bar 43 at all times except that at the proper time for gripping the workpieces the escapement bar 64 will be tripped to move rapidly under a substantial spring load to turn cranks 63 and cams 61 to permit the jaws of grippers 42 to close upon the workpieces, and similarly at the proper time for releasing workpieces the escapement bar 64 will be tripped to move rapidly under a substantial spring load to turn cranks 63 and cams 61 to open the jaws of grippers 42 against the springs 46.

The spring loading of escapement bar 64 is obtained by a yoke 65 riding on a rod 66 fixed to the frame 7. The yoke 65 extends over bar 64 and embraces a lug 67 thereon so that as bar 64 moves longitudinally with lifter bar 43 it carries yoke 65 therewith. As yoke 65 approaches either end of rod 66 in its movement it compresses a coil spring 68 disposed on the rod 66 and thereby spring loads the escapement bar 64.

The escapement bar 64 is normally latched to lifter bar 43 by means of a latch block 69 secured to the bar 64 and which is disposed to be engaged by either side of a slide latch 70 in a latch guide 71 carried by the lifter bar 43. The latch 70 is normally spring biased to a position where it prevents block 69 from passing the same as the lifter bar moves horizontally in a direction normally tending to move guide 71 past the block 69. As a consequence the latch block 69 engages latch slide 70 as shown in FIG. 6 and compels escapement bar 64 to move with lifter bar 43 until the carriage 29 reaches a position with the several grippers 42 above the corresponding stations and ready to be lowered thereto.

When the lifter bar 43 is lowered for either gripping or releasing the workpieces, a pivotal bell crank trip arm 72 carried by the latch guide 71 and connected to the latch slide 70 to actuate the latter, is lowered to dispose its outer end above an escapecent actuator in the form of a vertical push rod 73 which may be termed the gripper actuator rod.

Push rod 73 is carried by the outer end of a lever 74 pivoted to a part of frame 7 and is biased upward at all times by a strong spring 75.

The inner end of lever 74 carries a cam follower 76 that rides on the outer surface of rotary step cam 77 on cam shaft 40. When cam 77 is rotated to a position where follower 76 falls off the step 78 in the cam the push rod 73 is suddenly forced upwardly by spring 75 and strikes trip arm 72 to move the slide latch 70 inwardly and let latch block 69 pass the latch through a notch therein as shown in FIG. 7. Thereupon the strong spring 68 forces escapement bar 64 rapidly in a direction to actuate the crank arms 63 and turn cams 61 to their opposite position for actuating grippers 42.

The machine contains two sets of cams 77, followers 76, levers 74 and push rods 73 constructed and actuated as above described, one set being located to register with latch arm 72 at the position for carriage 29 and lifter bar 43 where the grippers 42 are to be closed upon the workpieces, and the other set being located to register with the latch arm 72 at the position for carriage 29 and lifter bar 43 where the grippers 42 are to be opened to release the workpieces. In each case the grippers 42 are actuated when the lift bar 43 is at the bottom of its stroke as a result of actuation by the vertical lifter cam 56.

The transfer mechanism 8 just described is adapted to successively transfer a workpiece 13 first from station 1 to station 2, then to station 3, then to station 4, then to station 5 and finally to station 6 where the workpiece is discharged from the machine. In doing this the transfer mechanism 8 actually advances five workpieces 13 simultaneously from stations 1 to 5, respectively, to stations 2 to 6, respectively.

The gripping of the workpieces by the transfer mechanism retains the angular indexed position for each successive workpiece as it is transferred from the measuring station 2 to re-index station 3 and then from station 3 to the correction station 4.

Figure 30:
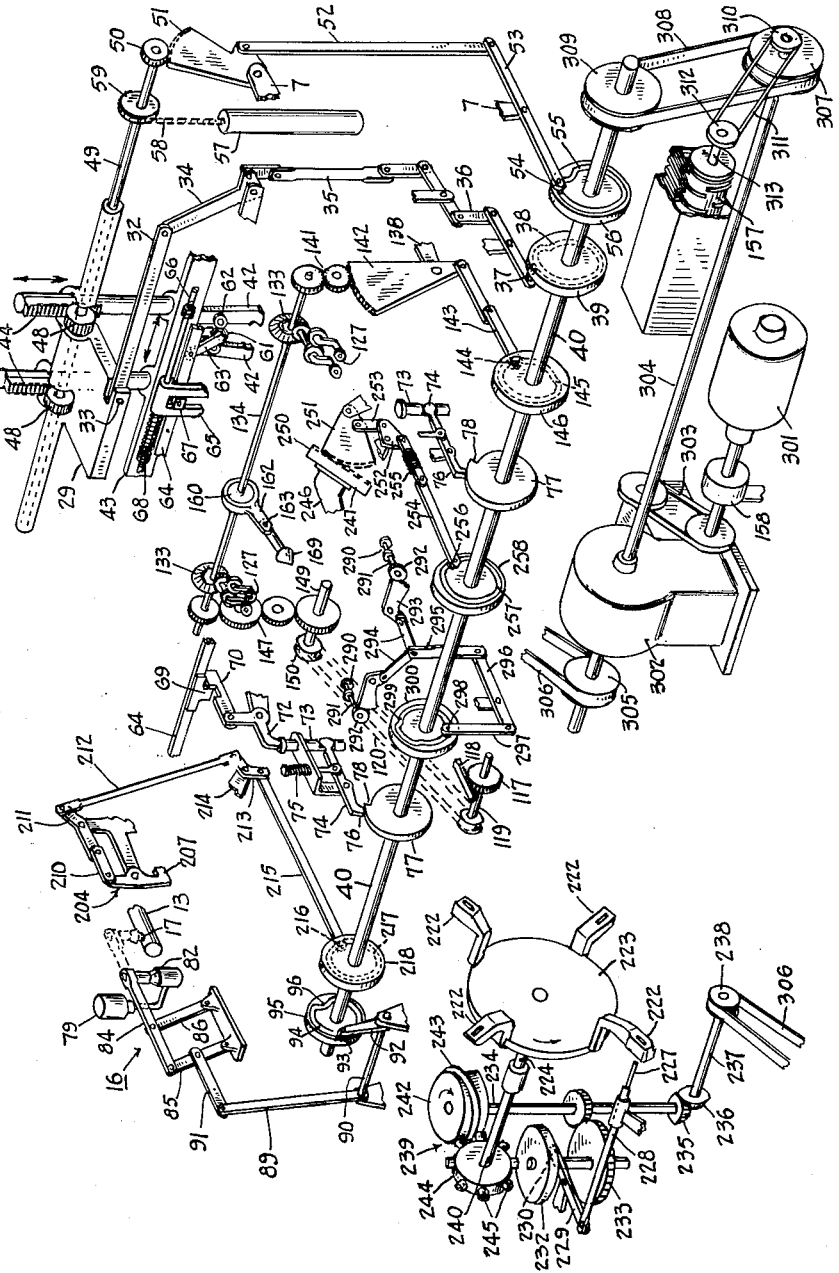
FIG. 30 is a schematic view showing the mechanical cam drives and machine operation.

The marker mechanism 16 for marking the workpiece at station 1 as shown in FIGS. 1, 10 and 30 comprises an ink reservoir 79 containing ink and having an adjustable bleeder connection from its bottom to a chamber 80 having an upwardly facing ink pad 81 adapted to raise ink to its surface by capillary action and to moisten rubber stamp die 82 therewith.

Die 82 is carried at the lower end of a vertical rod 83 which is reciprocated to first engage die 82 with pad 81 and then to engage die 82 with the outer surface of the shaft of workpiece 13 near the front end thereof.

The rod 83 is carried at the end of a horizontal arm 84 which is supported by a pair of parallel links 85 and 86 which are of equal length to provide a parallelogram support for the arm. The links 85 and 86 are pivoted at their upper ends to the arm 84 and at their lower ends to bracket 87 on plate 14.

The links 85 and 86 are actuated as indicated in FIG. 10 to move arm 84 between two extreme positions, one in which die 82 is pressed down upon pad 81 and the other in which the die is pressed upon the shaft of workpiece 13 at station 1. Any over travel is compensated for by providing a spring cushion connection 88 for rod 83 and arm 84.

Actuation of the links 85 and 86 is accomplished by a lever arm 89 rigidly secured at its lower end to a shaft 90 mounted in suitable bearings beneath the plate 14. Lever 89 is connected to link 85 by a generally horizontal link 91.

The shaft 90 carries a second lever arm 92 rigidly connected thereto and which has a cam follower 93 at its upper end disposed in a cam groove 94 in the side face of marker cam disc 95 on shaft 40. The cam groove has a jog 96 in it at the location where marking of the workpiece should take place.

Referring to station 2 where the workpiece 13 is supported for free rotation in bearings 18, the cradle 19 is similar to that employed in balancing machines heretofore and is suspended by thin spring strips 98 at the four corners from a pair of rigid brackets 99 on plate 14. The suspension of cradle 19 as shown provides for free lateral vibration of the cradle under forces arising from unbalance in the workpiece as the latter rotates rapidly.

A pick-up rod 100 is carried by a depending arm 97 from cradle 19 and extends horizontally therefrom in the direction of the vibrations referred to. A pick-up coil 101 is carried on the outer end of rod 100 and is disposed between the opposite poles of a permanent magnet 102 so that as the coil vibrates with rod 100 it cuts magnetic lines of force and tends to generate an electrical potential in the coil corresponding in magnitude generally to the magnitude of the vibration. The potential thus created is fed to a suitable unbalance measuring device as will be described hereinafter.

The device 20 for determining the angular position of unbalance in the workpiece shown best in FIGS. 13 and 14, comprises a carriage slide 103 mounted on a pair of parallel rods 104 supported on bracket 105 on frame 7.

The carriage 103 has a housing 106 open at its rear end to receive the front end of the protruding shaft of workpiece 13 when the carriage is moved axially thereof and rearwardly on rods 104.

The housing 106 contains a stroboscopic flash lamp 107 and a light pickup means comprising a photo-electric cell 108 disposed circumferentially from the lamp. A shield 109 is disposed between the lamp 107 and pick-up cell 108 to limit the light beam passing to the light pickup cell so that only light from lamp 107 that is reflected by the adjacent surface of the shaft of workpiece 13 reaches the photo-cell 108.

The housing 106 is rotatable on an axis coinciding substantially with the axis of rotation for workpiece 13 at station 2. For this purpose the housing 106 has a tubular shank 110 supported in suitable bearings in carriage 103. A motor 111 on carriage 103 is geared to drive the shank 110 and housing 106 through the small spur gear 112 on the motor shaft meshing with a large gear 113 on shank 110.

The lead wires 114 for the strobe lamp 107 and for photo-cell 108 pass outwardly of housing 106 through shank 110 to a terminal and switch housing 115 on carriage 103.

The leads 116 for motor 111 also pass to terminals in housing 115 as will be described hereinafter.

The reciprocation of carriage 103 to move housing 106 to cover the end of the shaft of workpiece 13 and thereafter to withdraw the housing and liberate the workpiece for transfer is accomplished by a gear 117 meshing with a rack 118 on the carriage. Gear 117 is secured on a drive shaft 119 in bracket 105 and which is driven by a belt 120 as hereinafter described.

Figure 3:
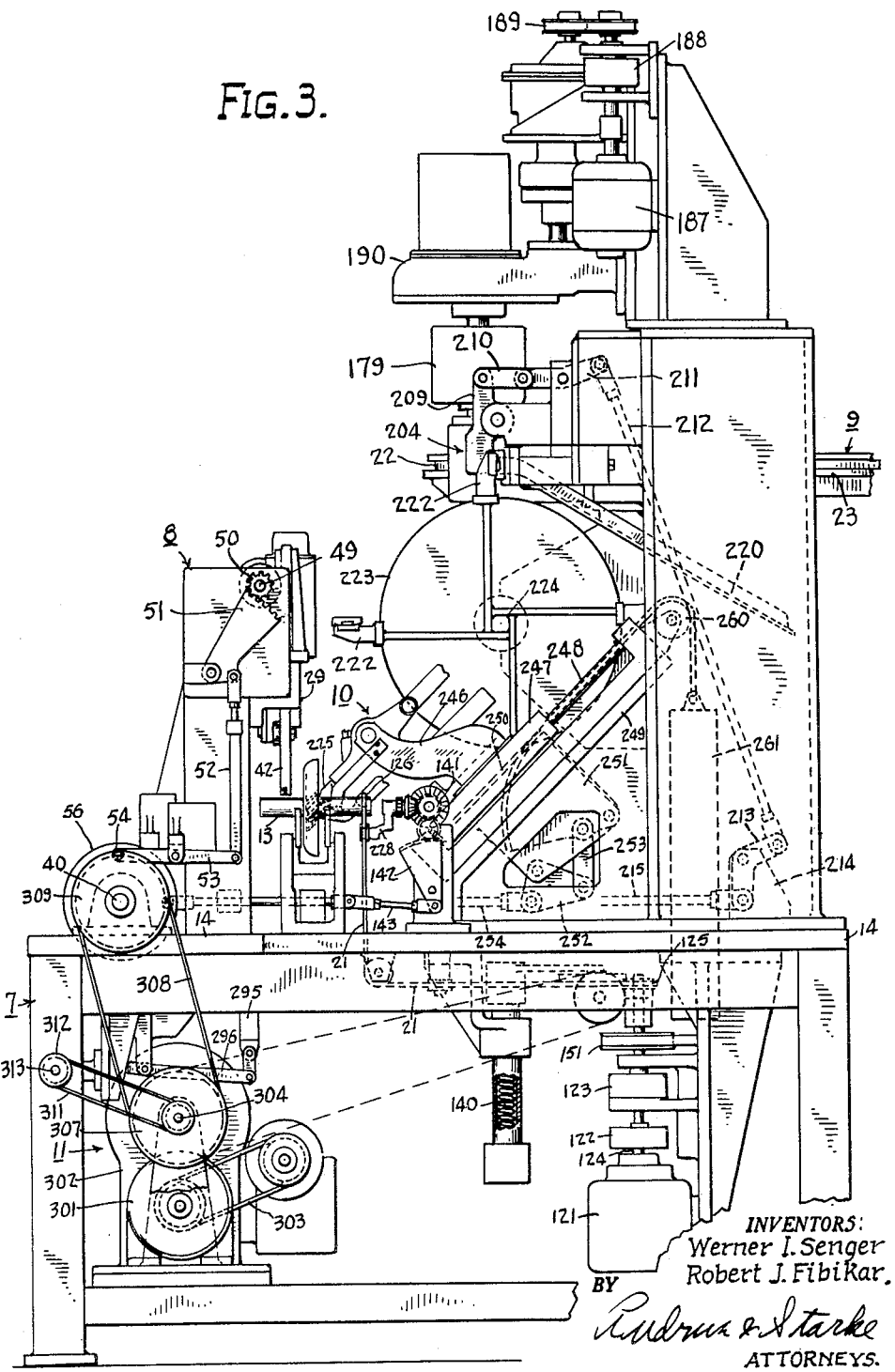
FIG. 3 is an end elevation of the machine taken from the right in FIGURE 1.
Figure 21:
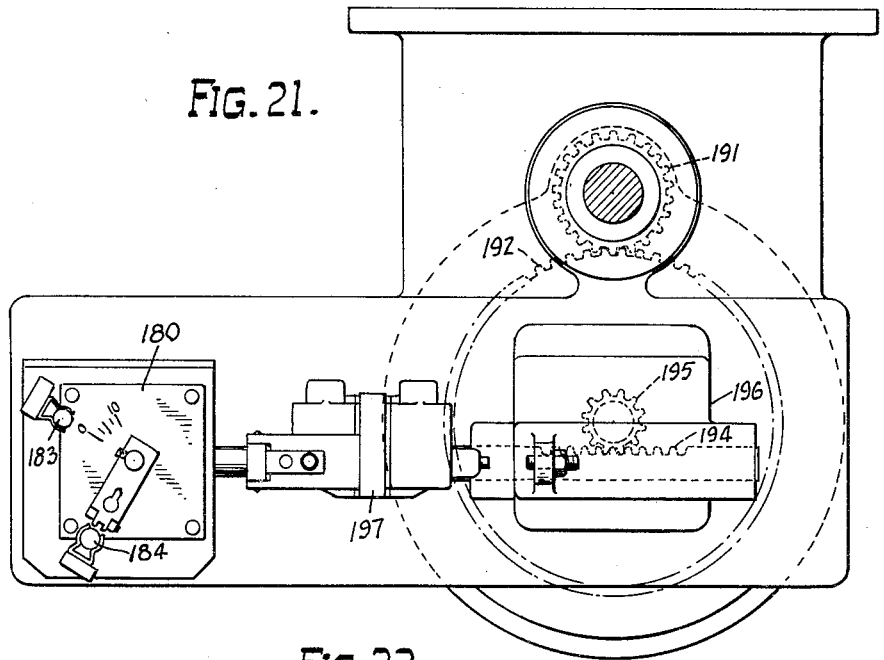
FIG. 21 is a top plan view partially sectioned showing the strip feed control mechanism.
Figure 22:
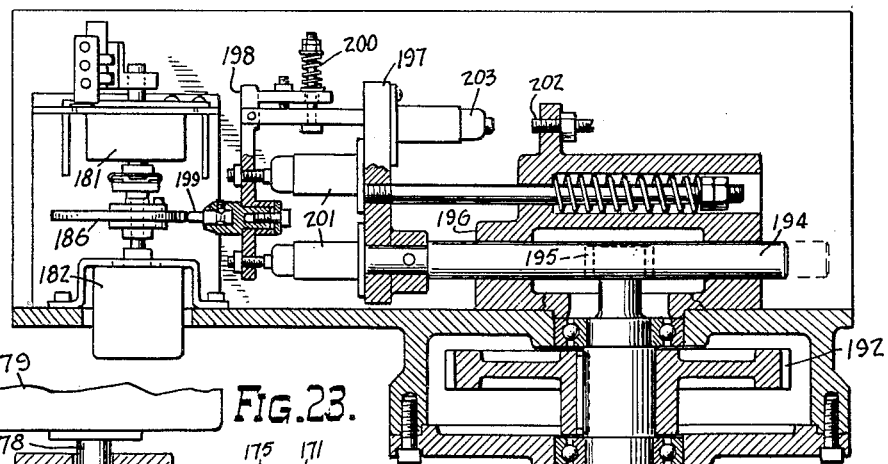
FIG. 22 is a vertical broken section taken generally centrally of FIG. 21.
Figure 23:
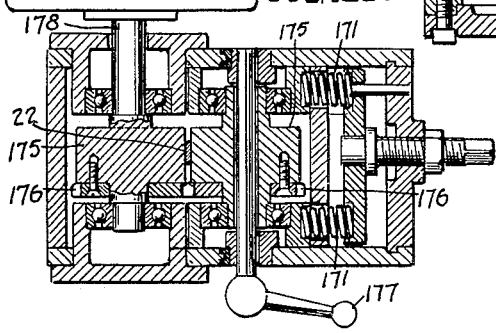
FIG. 23 is a detail vertical section of the strip feed mechanism taken on line 23—23 of FIG. 20.

The rotation of workpiece 13 at station 2, as shown best in FIGS. 3 and 15, is effected by belt 21 driven by the drive motor 121 in the base of frame 7. Motor 121 is continuous in operation and belt 21 is started and stopped alternately by the clutch 122 and brake 123, respectively, on the motor shaft 124.

The belt 21 passes from drive sheave 125 on the upper end of the driven part of shaft 124 over suitable idler pulleys and tightening means to a vertical course loop 126 at each of stations 2 and 5 where it is adapted to lower upon the shaft of the workpiece 13 for driving the latter. Each station 2 and 5 has a belt lifter mechanism, as shown best in FIGS. 16 to 18, for lifting the belt off from the end of the workpiece shaft to free the workpiece for transfer.

Each belt lifter referred to is of the same construction and the same description and numerals will apply to both. The lifter mechanism comprises a pair of idler pulleys 127 each mounted in a planetary manner by means of a crank arm 128 secured to a shaft 129 rotationally carried in a lifter head 130. The shafts 129 are disposed side by side and are geared together by pinion gears 131 secured thereon so that the shafts simultaneously rotate in opposite directions.

One of the shafts 129 carries a beveled gear 132 secured thereto in head 130 and which meshes with the beveled gear 133 having a horizontal shaft 134 shown as being disposed with its axis substantially parallel to the plane of the belt loop and at right angles to the shafts 129.

When pulleys 127 are down and close together as shown in FIG. 16, they are in the plane of the corresponding vertical belt loop 126 and the latter is tightened upon the shaft of workpiece 13 to drive the latter.

When it is desired to lift the belt 21 from the workpiece to free the latter for transfer, the gear 133 is turned in a direction to initially separate pulleys 127 by the rotation of shafts 129 in the opposite direction, thereby widening the loop and lifting its upper end off from the workpiece shaft. During this movement the belt 21 enters the groove in pulleys 127 and is carried thereby to the position shown in broken lines in FIG. 17, in which the stops 135 on the back side of the arms 128 carrying the pulleys 127 engage each other and stop further rotation of the shafts.

The head 130 is rotatable about shaft 134 so that when stops 135 engage each other to stop further rotation of shafts 129 in opposite directions the continued rotation of gear 133 carries gear 132 with it, thereby turning the head 130 and shafts 129 and the pulleys 127 as a unit upwardly about the axis of shaft 134 and pulling the upper end of loop 126 of belt 21 backwards axially away from the rear end of the workpiece shaft, as shown in broken lines in FIG. 18, to free the workpiece for transfer.

After transfer of the workpiece and presentation of its successor, the gear 133 is reversed in direction to drop the end of belt loop 126 over the end of the shaft of the workpiece 13.

A tension spring 137 is secured between the outer end of head 130 and the base of bracket 138 supporting shaft 134 to bias the head downwardly to a horizontal position for shafts 129 wherein an adjustable stop 139 on bracket 138 is engaged by head 130 and determines the position of the latter, and pulleys 127 are disposed in the plane of loop 126.

The tightening means 140 for belt 21 has a capacity for movement to take up the belt slack when the pulleys 127 lower to drop the belt onto the shaft of workpiece 13 at each of the stations 2 and 5.

Shaft 134 for station 2 is connected axially to the shaft 134 for station 5 to be driven thereby as shown in FIG. 16. Shaft 134 of station 5 is driven by a gear train 141 as shown in FIGS. 3, 16 and 30, and which in turn is driven by a gear segment 142 pivoted to bracket 138 and actuated by a push-pull rod 143 pivoted to segment 142 to provide a crank drive therefor.

Push-pull rod 143 carries a cam follower 144 on its outer end riding in a cam groove 145 in the side face of belt lifter cam disc 146 on shaft 40.

The shaft 134 for station 2 drives a train of gears 147 carried by bracket 138 as shown in FIGS. 17, 18 and 30. The lower shaft 149 for the gear train 147 carries a pulley 150 which is adapted to drive belt 120 to actuate the reciprocation of carriage 103 as previously described.

The angular indexing of workpiece 13 at station 2 occurs after brake 123 stop belt 21. For this purpose a sheave 151 is mounted on the driven end of shaft 124 between brake 123 and belt sheave 125 and is driven by V belt 152 from a drive sheave 153 which in turn is driven by index motor 154 through a free wheeling over running clutch 155 on the shaft of the motor.

Motor 154 is energized to drive shaft 124 and belt 21 in the same direction as they are driven by motor 121, but slowly until the photocell 108 receives a change in light by reason of mark 17 effecting the same change in reflection of light thereto from lamp 107 as previously occurred in locating the angle of unbalance during rotation of the workpiece, whereupon motor 154 is de-energized and the indexing of workpiece 13 is complete except for the index modification that may occur at station 3.

Station 3 is employed in the present instance to re-index the workpiece so that a given part will register for welding. Where no re-indexing of the workpiece is necessary the station 3 may be eliminated.

In the present case where the workpiece 13 has vanes or blades and it is desired to weld the correction mass 24 to a blade 25 nearest to the determined angle of correction, the workpiece must be re-indexed to position the blade 25 accurately relative to a given welding or correction location. For this purpose the workpiece 13 is supported rotationally in bearings 156 at station 3 as shown in FIG. 19.

An eccentric crank 160 is adjustably mounted on shaft 134 at station 3. The crank 160 carries a pitman 162 with a rod extending to a pin 163 pivotally securing the same to a slide 164.

The slide 164 its mounted for horizontal reciprocation on two slide rods 166 and 167 in supporting bracket 168 to move generally parallel to the shaft of workpiece 13 at one side thereof.

The slide 164 carries a conically faced pusher 169 which is adapted to enter the back of the workpiece 13 at the intended point of correction to engage the nearest blade 25 and turn the workpiece and position the vane accurately with respect to the angular position needed to have the same register with the welding machine of station 4.

The pusher 169 has a stem 170 retained in slide 164 and which is biased by spring 172 outwardly to cushion the action of the pusher and compensate for inaccuracies in blade construction and location.

Since shaft 134 oscillates in actuating the belt lifters, the eccentric crank 160 correspondingly oscillates to first move the slide 164 to move pusher 169 into the workpiece 13 to engage blade 25 and turn the workpiece to the desired position, and then in reverse to return the slide 164 to starting position where pusher 169 is withdrawn from the workpiece and the latter is free for transfer to station 4.

Prior to the transfer of the workpiece 13 from station 2 to station 3, the correction mass 24 for the specified workpiece is sheared from strip stock 22 fed from reel 23 by the mechanism 9.

Figure 2:
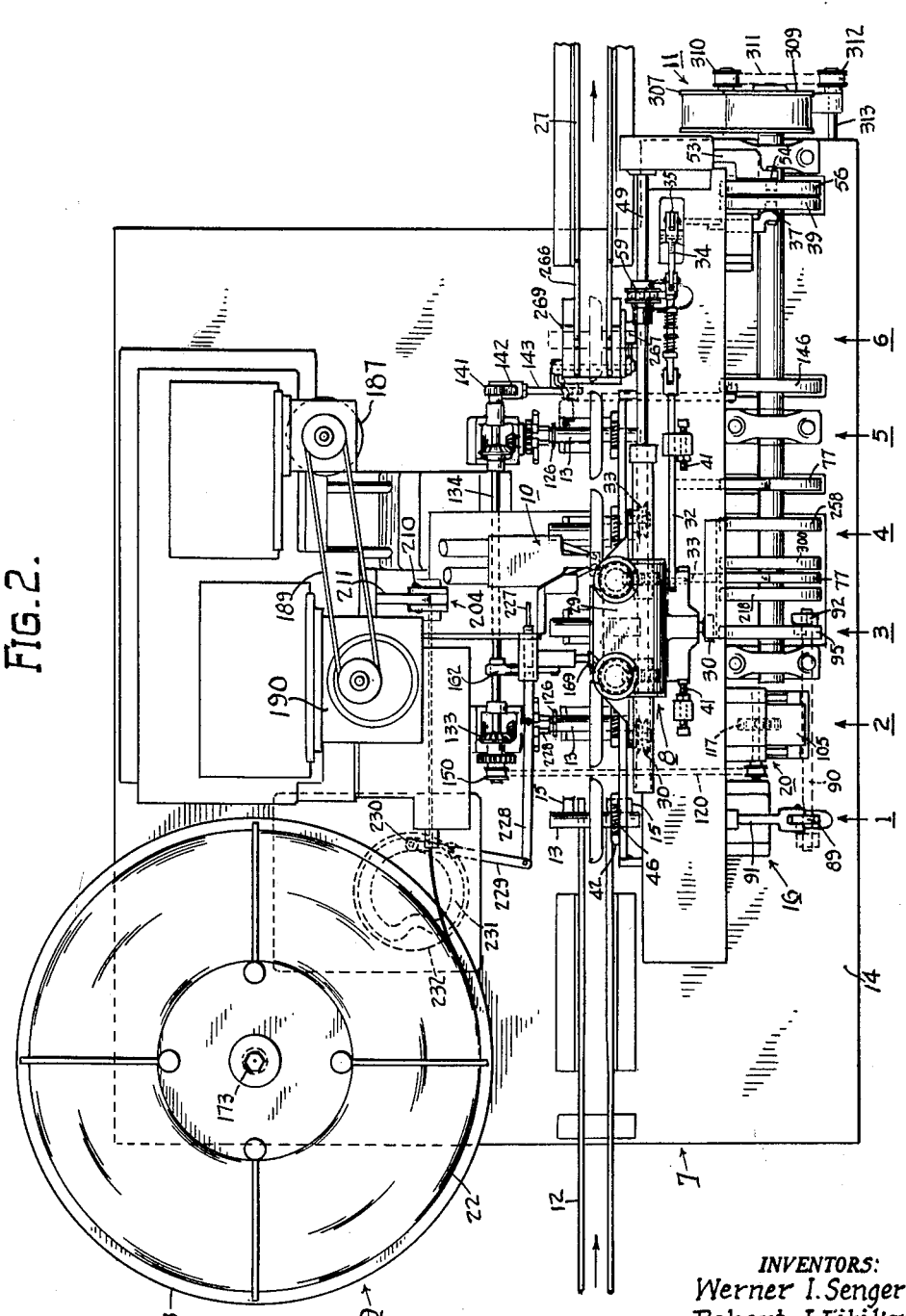
FIG. 2 is a top plan view of the machine.

For this purpose reel 23 as shown in FIGS. 1 and 2, is disposed horizontally for free rotation on a vertical stub shaft 173 to carry metal strip stock 22 on edge.

The stock strip 22 as shown in FIGS. 20 to 23, first passes through a set of spring loaded straightening rolls 174 and then through the spring pressed feed rolls 175. The feed rolls 175 are geared together by spur ring gears 176 secured to one end of the corresponding rolls. Springs 171 maintain the rolls 175 tight upon the stock 22.

Eccentric crank means 177 are provided to release the pressure of the rolls 175 upon stock 22 by changing the support of one of the feed rolls. The other feed roll is mounted on a drive shaft 178 driven by an overrunning clutch 179.

The amount of stock 22 to be fed to the shear for any given workpiece is determined by an unbalance measuring device, which in this instance is illustrated as a voltmeter relay 180 energized by potential proportional to the potential generated in pick-up coil 101 and which in turn is bucked to zero reading by an opposing potential established through a weighing potentiometer 181.

The potentiometer 181 is driven by the weighing motor 182 which is controlled through limit switches 183 and 184 and the voltmeter relay 180. The shaft 185 of motor 182 carries a cam disc 186 thereon and which is constructed to provide an accurate measure of the length of stock to be cut to correspond to the necessary correction mass 24 for any given weighing movement of motor 182 and potentiometer 181.

The stock feed rolls 175 which measure the stock to be sheared are driven by a feed motor 187 as shown in FIGS. 1 and 2, through a control mechanism responsive to the setting of cam 186 in each instance. The shaft of feed motor 187 has an electric brake 188 which limits the motor output for accurate control purposes.

Feed motor 187 drives a belt 189 which in turn drives the speed reduction gearing 190, the output of which goes to a spur gear 191 in the feed measuring unit. Gear 191 drives a bull gear 192 on the shaft 193 which latter is coupled to shaft 178 by the clutch 179.

Rotation of shaft 193 is measured by means of a rack 194 driven by a pinion gear 195 on the shaft. Rack 194 moves longitudinally in a bearing support 196 and carries with it a control carriage 197.

A lever 198 is carried on the front of carriage 197 and has on it a cam stop 199 adapted to engage cam 186 as the rack 194 moves carriage 197 toward the cam. Lever 198 is biased forwardly by spring 200 so that it yields upon engagement between stop 199 and cam 186 to trip a limit switch 201 on carriage 197 to apply the brake 188 as hereinafter described.

After shearing of the stock, the motor 187 is reversed and rack 194 moves carriage 197 back to starting position which is determined by the adjustable stop 202 on support 196 and which engages a limit switch 203 to apply brake 188. During this return movement of the drive mechanism the overrunning clutch 179 prevents corresponding reverse drive of the feed rolls 175.

The end of strip 22 is fed through a shear 204 at station 4 which may be of any suitable construction, such as that shown in which the strip is disposed on edge against the face of a mandrel 205 having a slot 206 therein. A shear punch 207 is carried by a pivotal lever 209 to register with slot 206 in mandrel 205.

Lever 209 as shown in FIGS. 1, 2 and 30, is actuated by a toggle link 210 and lever 211. A push-pull rod 212 is pivoted to the outer end of lever 211 and extends downwardly at an angle to the back of the frame 7 where it connects with one arm of bell crank lever 213 carried by a bracket 214 on plate 14.

A horizontal push rod 215 is pivoted at one end to the other arm of bell crank lever 213 and extends to the front of the machine where it carries a cam follower 216 riding in a cam groove 217 in the side face of a shear cam disc 218 on shaft 40.

The cam groove 217 is constructed to actuate the shear punch 207 upon completion of the strip measuring to cut off the desired length of strip to constitute the correction mass 24, and then to withdraw the punch to clear the path for the next feed of strip 22. The slug 219 cut from strip 22 drops by gravity down a chute 220 to a waste pile.

The correction mass 24 at the time of shearing is disposed in a slot 221 in a transfer head 222 on the periphery of a feeder wheel 223. The wheel 223 is rotationally mounted for intermittent rotation and may carry a plurality of heads 222, that shown in FIGS. 3, 25, 26 and 27 having four heads 222 and being adapted to intermittently rotate for successive amounts of one-eighth of a revolution at a time.

The head 222 receiving a correction mass 24 at the shear 204 is disposed vertically at the top of wheel 223, the latter being carried by a horizontal drive shaft 224. During transfer of a workpiece 13 from station 2 to station 3 the head 222 which has received the correction mass 24 for the specified workpiece is rotated one-eighth of a revolution away from the shear 204. After a substantial dwell and in the middle of the time during which the specified workpiece 13 is at station 3 the wheel 223 rotates another one-eighth revolution to bring the specified mass 24 and head 222 to a 90° position from shear 204 and at the same time position the next head 222 at the shear 204 for receiving the end of strip 22 as the latter is measured for a correction mass corresponding to that needed for the next workpiece which is then located in station 2.

As the workpiece 13 is transferred from station 3 to the correction station 4 the wheel 223 is again rotated for one-eighth of a revolution to bring head 222 containing correction mass 24 down to a 45° angle position, locating mass 24 adjacent to the welding tongs 225 and in alignment with a groove 226 in a carrier 208 for receiving the mass between tongs 225, as shown in FIGS. 24 and 25.

At this position for head 222 and while the wheel 223 dwells, a poker 227 is actuated to poke the correction mass 24 from slot 221 in head 222 into the groove 226 where it is positioned between the welding tongs 225.

For this purpose as shown in FIG. 30, the poker 227 is adjustably axially mounted on the pusher rod 228 which is pivoted to one end of a lever 229. The other end of lever 229 carries a cam follower 230 riding in a cam groove 231 in the lower face of a poker cam disc 232 that is rotated in synchronism with the intermittent rotation of wheel 223 to effect actuation of poker 227 immediately after head 222 has located a correction mass 24 in registry with groove 226 in carrier 208.

The cam disc 232 is driven by suitable spur gears 233 from a vertical input shaft 234 carrying a beveled gear 235 at its lower end and which is in turn driven by a beveled gear 236 on a horizontal shaft 237 which has a belt pulley 238 for driving the same as will be described hereinafter.

The vertical input shaft 234 extends upwardly from the spur gears 233 and drives a roller gear mechanism 239 or other means, the output shaft 240 of which is coupled to shaft 224 to drive wheel 223 intermittently as previously described.

Mechanism 239 comprises a gear 242 on shaft 234 and of the nature of a worm but in which the teeth 243 have a substantial part of their course lying in corresponding planes normal to the axis of rotation whereby a dwell is provided in the drive of the follower wheel 244.

The follower wheel 244 has a plurality of radially mounted circumferentially spaced rollers 245 thereon adapted to receive the teeth 243 of gear 242 therebetween. The follower wheel 244 is keyed to the output shaft 240 that is coupled to shaft 224 to drive the latter.

Referring further to station 4 and to FIGS. 26 and 27, the welding electrode tongs 225 are pivotally carried on a bracket 246 on a welding carriage 247 to reciprocate between a position where groove 226 of carrier 208 receives the correction mass 24 from slot 221 in head 222, as in FIGS. 25 and 26, to a position where the mass 24 is held against the lower surface of blade 25 and the latter is disposed between the electrode jaws or tongs 225, as in FIG. 27.

For this purpose welding carriage 247 is slidable on two rods 248 in a bracket 249 on plate 14 to the rear of station 4. The rods 248 are disposed generally at the angle at which the electrode tongs 225 slide over blade 25, which is shown in the drawings as approximately 45° but which may be at any angle dependent upon the shape of the blade 25 or other part to which mass 24 is to be welded.

Actuation of carriage 247 is effected by a longitudinal gear rack 250 thereon and which is engaged by a gear segment 251 pivotally actuated by bell crank lever 252 through link 253. Lever 252 is actuated by a push rod 254 having a spring cushioned coupling 255 therein to provide for an overtravel of the push rod when carriage 247 reaches its adjustable stops, as hereinafter described.

Push rod 254 is actuated by a cam follower 256 on the forward end thereof riding in a groove 257 in welder cam 258 on shaft 40.

The carriage 247 as shown in FIGS. 3 and 27, is counterweighted by means of a chain 259 connected to the upper end thereof and extending parallel to slide rods 248 to a pulley 260 on bracket 249, and on over the pulley to suspend the counterweight 261.

When the workpiece 13 is transferred from station 3 to station 4 transfer head 222 carrying the correction mass 24 therefor is moved downward from the horizontal position to a 45° position by a one-eighth revolution of wheel 223. Thereupon the poker 227 pushes mass 24 from slot 221 in head 222 into groove 226 in the carrier 208.

When carrier 208 receives the correction mass 24 the cam 258 actuates pusher rod 254 and causes the welding carriage 247 to slide downwardly on inclined rods 248 until the mass 24 is adjacent blade 25 and the latter is straddled by tongs 225, and the carriage has engaged the adjustable stop 262 on bracket 249.

The welding electrode tongs 225 are suitably insulated from one another and are connected by water cooled leads 263 to the opposite terminals of a suitable welding transformer not shown. Upon location of correction mass 24 at the side of blade 25 the transformer is energized and tongs 225 are pressed upon the parts to effect a weld of mass 24 to the blade 25.

After the welding operation the welding carriage 247 is moved upwardly along rods 248 to its upper position where it engages an adjustable stop 264 and is thereby located to receive the next correction mass 24 from the next successive head 222 for the succeeding workpiece 13.

The workpiece 13 that has mass 24 welded thereto at station 4 is thereupon transferred to station 5 where it rests on a cradle 26 similar to cradle 19, and where belt 21 is lowered over the end of the workpiece shaft by the belt lifter mechanism actuated by cam 146 as previously described.

The workpiece 13 at station 5 is then rotated by belt 21 and any unbalance in the workpiece is tested as by the inspection device of application Serial No. 471,627, filed November 29, 1954, by Werner I. Senger, one of the present joint inventors, now abandoned, or of application Serial No. 479,196 filed December 31, 1954, by Robert J. Fibikar, the other present joint inventor, now Patent No. 2,891,241. As shown in the present instance instance vibrations of cradle 26 are translated into electric potential impulses by the electro-magnetic pick-up coil 368 as shown at station 5 in FIG. 11. The electrical impulses thus generated in proportion to the magnitude of vibration or of unbalance in the workpiece are then fed to a suitable tolerance voltmeter relay 265 as shown in FIG. 35, to determine whether the unbalance remaining in the workpiece after correction exceeds a predetermined tolerance limit for unbalance.

If the workpiece is substantially balanced so that any unbalance therein does not exceed the tolerance limit for unbalance the meter relay 265 fails to trip and as a consequence the reject gate 266 in the rails 27 at station 6, as shown in FIGS. 28 and 29, remain raised so that when the workpiece 13 is transferred from inspection station 5 to outgoing station 6 the workpiece rolls down the outgoing rails 27.

If the workpiece 13 at station 5 has unbalance exceeding the tolerance limit for unbalance the meter relay 265 trips and energizes solenoid 267 to trip the reject gate 266 to a downward angular position indicated in dash lines in FIG. 28 where the rails of the gate register with outgoing reject rails 28, so that when the workpiece is transferred from station 5 to station 6 it rolls down from gate 266 onto rails 28 and out onto a reject pile.

For this purpose the reject gate 266 is secured to a pivot shaft 268 pivoted in a supporting bracket 269 on plate 14. A counterweight 270 is adjustably attached to a rod 271 secured to the pivot shaft 268 to dispose the weight to bias the gate 266 toward its upper position at all times.

The gate 266 is latched in its upper position against downward swinging when a workpiece is dropped on it at station 6. For this purpose an arm 272 is pivoted to bracket 269 at 273 and has a slot 274 at its outer end for loosely receiving a pin 275 secured to gate 266. The axis of pivot 273 is parallel to pivot shaft 268 so that as gate 266 pivots downwardly the arm 272 pivots downwardly therewith. The arm 272 has an upwardly facing notch 276 which receives a dog 277 on a latch link 278 that is loosely pivoted on pivot shaft 268.

The lower end of latch link 278 is linked to the plunger of solenoid 267 whereby when the solenoid is energized the link is pivoted to disengage the dog 277 from notch 276 and thereby free gate 266 to pivot downwardly when a workpiece 13 is dropped upon it.

A spring 279 biases a pin 280 against latch link 278 to hold the link in normal position where dog 277 engages notch 276.

When solenoid 267 pivots link 278 against spring 279 to release the dog 277 from notch 276, the link 278 becomes locked in latch release position by a dog 281 pivoted to bracket 269 and which rides on the upper end of the link and drops into a notch 282 to hold the link after de-energization of the solenoid.

In the position of the parts just described the gate 266 is free to pivot downwardly upon dropping the workpiece 13 thereon, and to deliver the workpiece to the reject rails 28.

When gate 266 pivots downwardly it pivots arm 272 which carries a dog 283 that lifts lock dog 281 clear of notch 282 and allows spring 279 to bias link 278 until the end of dog 277 rides on arm 272.

After the workpiece has rolled from gate 266 onto reject rails 28 the counterweight 270 lifts the gate upwardly to registry with outgoing rails 27 and dog 277 drops into notch 276 to retain the gate in that position. A pair of adjustable stops 159 carried by bracket 269 determine the registry position for gate 266 and rails 27.

A momentary energization of solenoid 267 is sufficient to set the mechanism to cycle through a reject of a single workpiece, and thereafter the mechanism is returned to a normal position where workpieces pass out on rails 27 until another reject occurs.

The cradles 19 and 26 are secured against vibration during loading and unloading of the same so that transient vibrations are not introduced and there is no damage to the workpiece or the cradle bearings. For this purpose as shown in FIG. 11, a brake is provided for each of the cradles and which comprises a laterally extending strip or rod 284 of suitable material that is lengthwise rigid and which is secured to the corresponding cradle to be carried thereby, a clamp 285, the jaws of which are carried by upper and lower pivotal brake arms 286 and 287, respectively, and disposed to engage the corresponding strip 284, an actuating rod 288 for each upper brake arm 286, and an actuating rod 289 for each lower brake arm 287.

The actuating rods 288 and 289 for each clamp are operated simultaneously by corresponding eccentric cranks 290 on a shaft 291. Each shaft 291 carries a gear pinion 292 meshing with a gear segment 293 which is pivotally actuated by a toggle link 294 from a push rod 295. The two toggle links 294 for the two cradles 19 and 26 are pivoted in common to push rod 295 and the latter is linked to a lever 296 which in turn is actuated by a push rod 297 having a cam follower 298 riding in a cam groove 299 in the face of brake cam 300 on shaft 40, as shown in FIGS. 11 and 30.

The jaws of each clamp 285 are faced with felt to cushion the clamping action.

The cam groove 299 is constructed to provide a clamping of the strips 284 at all times except when the corresponding workpieces 13 are being rotated for detection of unbalance. When it is desired to release the cradles 19 and 26 for unbalance measuring and detection, the cam groove 299 effects pushing of rod 297 which in turn actuates the toggle links 294 and pivots segments 293 to thereby drive eccentric cranks 290 on each shaft 291 to effect separation of the corresponding brake arms 286 and 287 at both stations 2 and 5.

The control drive for the machine comprises a control drive motor 301 shown in FIGS. 1, 3 and 30, and which drives a gear speed reducer 302 by means of a belt 303. The output shaft 304 for the speed reducer 302 constitutes the main drive shaft and carries three pulleys.

Pulley 305 on the inner end of shaft 304 carries a belt 306 which drives pulley 238 for driving the poker cam 232 and the transfer wheel 223.

Pulley 307 on the outer end of shaft 304 carries a belt 308 which drives a pulley 309 on the outer end of cam shaft 40 for driving the several cams 39, 56, 77, 95, 146, 218, 258 and 300, as previously described.

Pulley 310 also on the outer end of shaft 304 carries a belt 311 which drives a pulley 312 on the outer end of a timer shaft 313.

Timer shaft 313 carries a timer drum 157 having a plurality of adjustably located cams thereon for actuating switches which control the electrical sequences for actuating the machine in a series of successive fixed time cycles. These will be explained in connection with the explanation of the electrical control circuits for the machine.

Referring to FIGS. 31 to 37, showing the various electrical circuits, the three phase power line 314 in FIG. 36 are closed to the control transformer 315 by circuit breaker 316. The secondary of transformer 315 supplies power to two vertical lines 317 and 318, between which the several control means are connected. The several cross lines containing control elements are numbered beginning with line L1 which contains the transformer secondary referred to.

The machine start switch 319 in line L2 is manually closed to start the machine. Upon closing of switch 319 current is supplied to the several electronic circuits which include the plate current supply amplifier for the unbalance measuring circuits fed through transformer 320 in line L2, the unbalance amount measuring circuit fed through transformer 321 in line L3, the angle and phase measuring circuit fed through transformer 322 in line L4, the plate current supply amplifier for unbalance inspection fed through transformer 323 in line L5, and the unbalance inspection measuring circuit fed through transformer 324 in line L6.

Referring to FIGS. 32 to 35, the electronic circuits shown provide for the measuring of the amount and angle of unbalance at station 2 and the tolerance limit inspection for unbalance at station 5.

Figure 32:
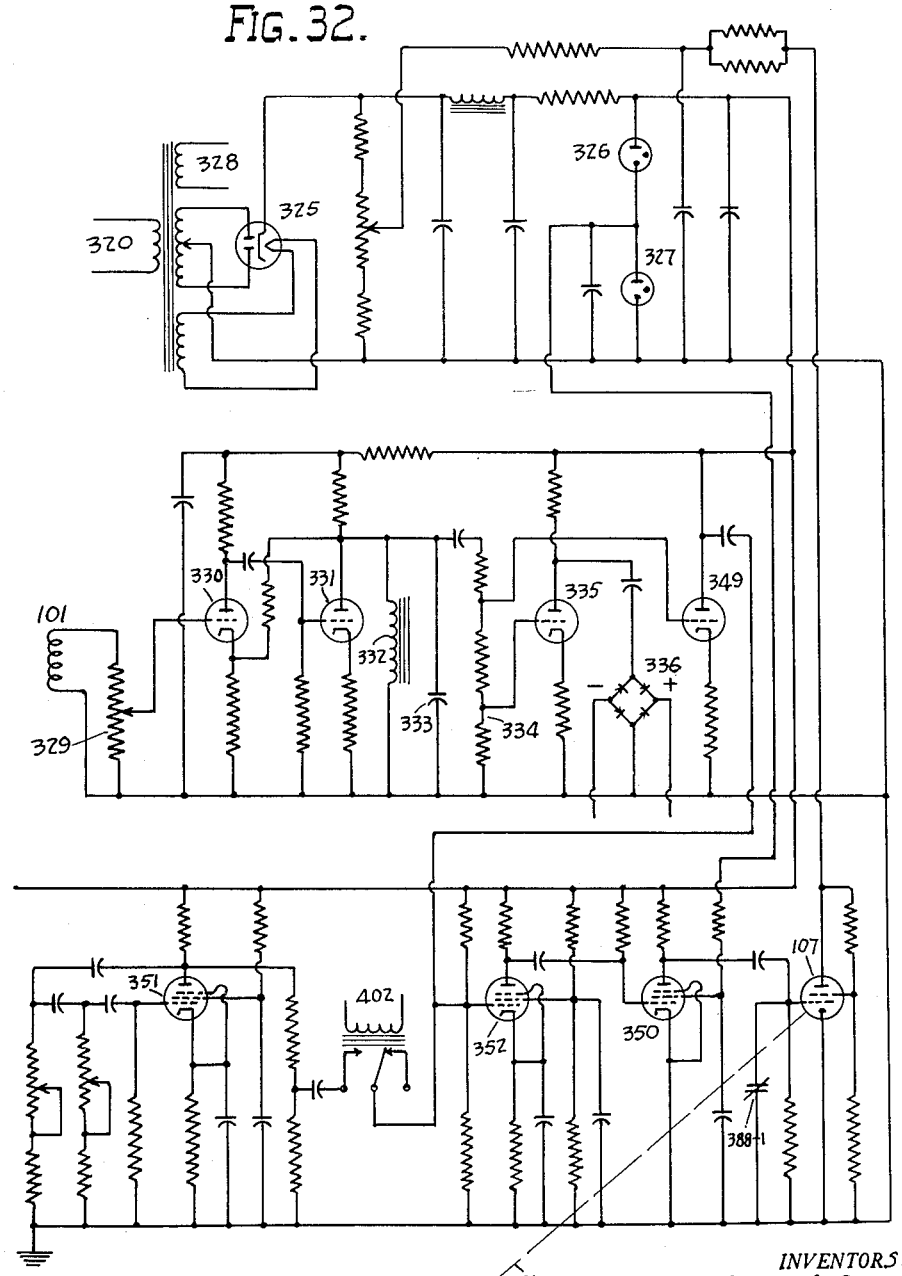
FIG. 32 is a circuit diagram showing the amplifier circuits for the unbalance signal from the unbalance measuring station.

For this purpose transformer 320, see FIGS. 32 and 36, feeds a rectifier tube 325, the output of which is suitably filtered and then passed through voltage regulator tubes 326 and 327. The direct current thus produced is utilized to operate the vacuum tubes in the amplifiers of the unbalance amount and angle measuring circuits. The filaments of the several vacuum tubes in these amplifiers are not shown, it being understood that suitable filament current for these may be supplied from the extra secondary winding 328 of transformer 320.

The pick-up coil 101 at station 2 is shown in FIG. 32 as feeding its output voltage, which is directly proportional to the amplitude of the vibration and consequently to the magnitude of the unbalance, to the calibration potentiometer 329 which modifies the voltage so that the voltmeter relay 180 will read directly in units of the needed unbalance correction.

The vacuum tubes 330 and 331 and their associated components amplify the calibrated voltage without changing the wave shape. The inductance 332 and the capacitance 333 constitute a tuned inductive-capacitive filter that bleeds off any transient voltage that is at a frequency other than the frequency of the rotation of the workpiece.

The inductance-capacitance filter 332—333 only passes voltage of a frequency corresponding to the rotational frequency of the workpiece and of a sine wave shape with an amplitude directly proportional to the unbalance of the workpiece and such voltage is applied across a voltage divider 334.

A portion of the voltage across divider 334 is amplified by the vacuum tube 335 and its associated components and is then fed to the rectifier 336. The direct current output of rectifier 336 is proportional to the unbalance of the workpiece and as shown in FIG. 33, is impressed upon the coil 337 of the voltmeter relay 180 whereby the needle 338 of the voltmeter is deflected an amount proportional to the unbalance of the workpiece.

The voltmeter relay needle 338 operates between two contact points, one contact 339 being positioned at the zero meter reading, and the other contact 340 being positioned at the point of indication of an unbalance requiring a correction mass 24 approximating at least one-half the minimum length of mass that can be applied.

The meter relay needle 338 is connected to the negative side of coil 337. As the needle 338 touches zero contact 339 it completes a circuit that de-energizes relay 341 closing contacts 341–1 in line L42, in FIG. 38, and stops or prevents the weighing operation. As the needle 338 touches the contact 340 is completes a circuit that de-energizes relay 342 closing contact 342–1 in line L41 in FIG. 38, and starts the weighing operation.

Figure 33:
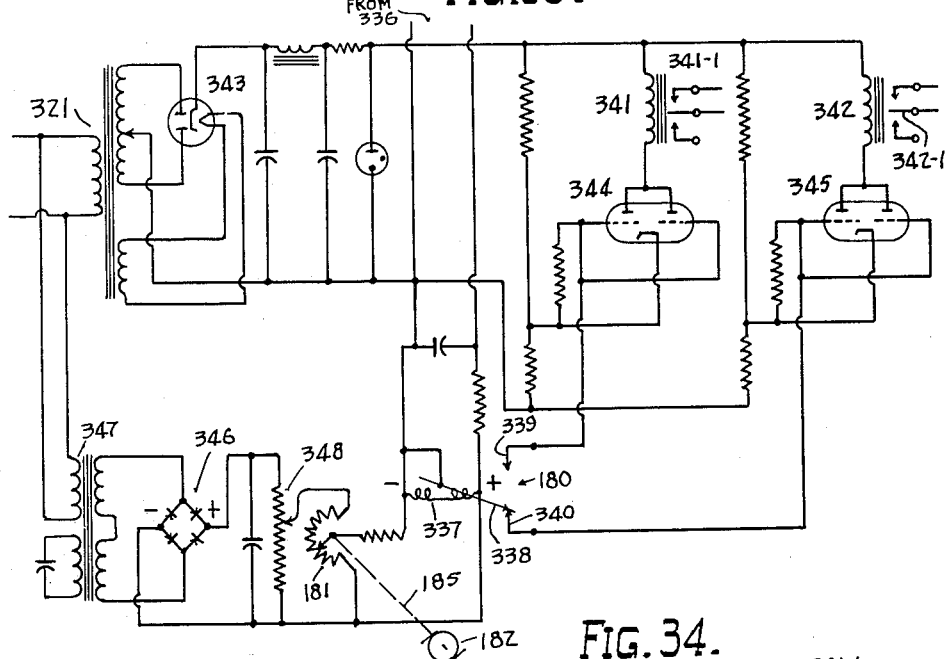
FIG. 33 is a circuit diagram of the weighing portion of the circuit for the unbalance measuring station.

For this purpose, and to control the voltage level of contacts 339 and 340, the transformer 321 in FIGS. 33 and 36 feeds the rectifier tube 343 which in turn supplies current to vacuum tubes 344 and 345 which are used to control relays 341 and 342, respectively, and which provide a high impedance, low current load for the meter relay contacts 339 and 340.

Closing of needle 338 with contact 340 de-energizes relay 342 thereby closing contacts 342–1 and starting the weighing operation as will be described in connection with the control diagram of FIGS. 36 to 38, inclusive.

For weighing purposes a rectifier 346 is connected to receive alternating current from a constant potential transformer 347, the primary of which is supplied in parallel to the primary of transformer 321. The rectifier 346 supplies a direct current voltage across potentiometer 348 of a constant magnitude regardless of possible fluctuations of line voltage. The adjustable tap on potentiometer 348 adjusts the voltage as it goes to the weighing potentiometer 181 so that it will be proportionate to the voltage in the coil of voltmeter relay 180 for weighing purposes.

The voltage output of the potentiometer 181 is fed directly to the coil 337 of the voltmeter relay 180 in opposite polarity to that fed thereto from rectifier 336. Thus, with the unbalance voltage impressed upon the coil 337 of voltmeter relay 180 tending to move the needle 338 toward contact 340, the slide tap on weighing potentiometer 181 is moved by motor 182 until an equal and opposite voltage is impressed on the coil 337 of voltmeter relay 180 and the needle 338 is brought back to a zero reading or until it reaches the zero contact 339.

The movement of the slide tap on potentiometer 181 then becomes a direct measure of the unbalance in the workpiece. The shaft 185 of the weighing motor 182 is also the shaft for the slide tap of potentiometer 181, and as stated above, the shaft 185 carries the cam disc 186 which determines the amount of strip feed prior to shearing.

The weighing operation will be further described in connection with the control circuits of FIGS. 36 to 38.

The angle determination is effected automatically during the weighing operation. For this purpose a portion of the voltage across the voltage divider 334 is fed to the grid of a vacuum tube 349 and the output is amplified by tube 352 and limited by tube 350 and then passed through a differentiator to the stroboscope lamp 107 to flash the latter.

For the purpose of later indexing of the workpiece as described in the application Serial No. 468,397, filed November 12, 1954, by Werner I. Senger, one of the present inventors, now Patent No. 2,944,424, an oscillator including vacuum tube 351 and associated parts supplies a sinusoidal voltage of a frequency corresponding to that of the stroboscope lamp triggering voltage, and which is fed through tubes 352 and 350 to trigger the lamp for indexing. Also, see the description contained in application Serial No. 468,397, now Patent No. 2,944,424, referred to above.

Figure 34:
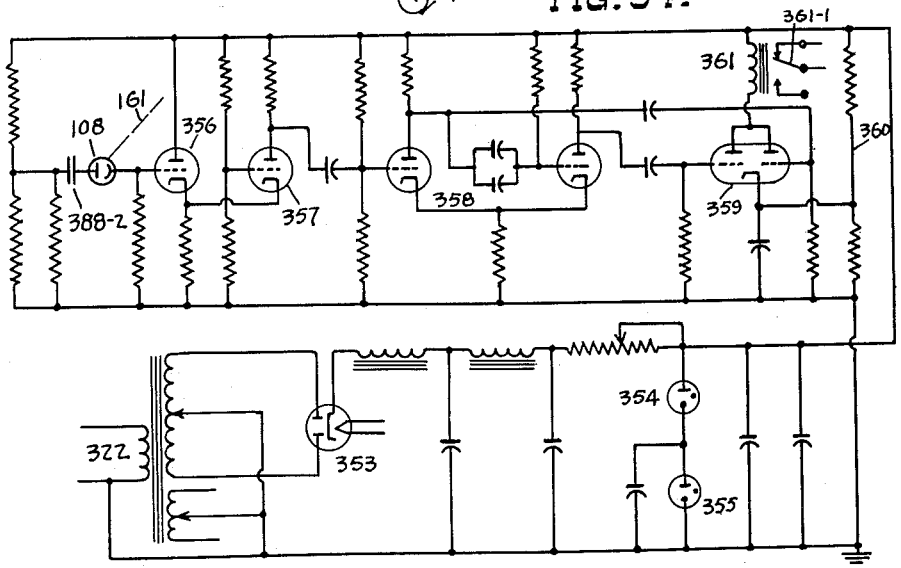
FIG. 34 is a circuit diagram of the angle determination circuit for the unbalance measuring station.

The circuit for the angle reader is shown in FIG. 34. Current is supplied to this circuit by transformer 322 in line L4 of FIG. 36, and then passes through the rectifier tube 353 and from thence through filters and voltage regulator tubes 354 and 355 which give the needed direct current voltage for operation of the reader.

The reader comprises the photo-electric tube 108 on carriage 103. Photo-tube 108 and strobe-lamp 107 are rotationally translated about the shaft of workpiece 13 by motor 111 in line L29 of FIG. 37, until the reflected light beam 161 passing from the lamp 107 to the shaft and back to the tube 108 is interrupted by the black mark 17 at the moment the light 107 flashes for each revolution of the workpiece.

The output of photo-tube 108 is amplified by vacuum tube amplifiers 356 and 357 and then sent through a multivibrator 358 that produces two output voltages, each of which is in the form of a square wave, but in opposite phase.

The separate phase outputs of multivibrator 358 are fed to the corresponding grids of a dual control tube 359. Control tube 359, together with its associated components including the voltage divider 360, provide an output that is utilized to supply a constant plate current to the coil of relay 361 to normally maintain its contacts 361–1 in line L24 closed when light is received by photo-cell 108.

When the light passing to photo-cell 108 is interrupted by black mark 17, the coil of relay 361 becomes de-energized and contacts 361–1 open, as will be more fully described in connection with the control circuits and as shown in FIG. 37.

Various types of photo-electric reader devices may be employed as referred to in the Senger application noted above. In the present illustration the leading edge of mark 17 is used to determine the angle of unbalance, and rotation of the photo-tube 108 and lamp 107 about the workpiece shaft is stopped at the point at which the photo-tube is going from light to dark. This must be so whether the photo-tube 108 starts on light or on dark. The manner in which this is accomplished will be more fully described in connection with the control circuits of FIGS. 36 to 38.

The inspection circuits for station 5 as shown in FIG. 35 are somewhat more simple than those described for station 2.

The transformer 323 in line L5 of FIG. 35 supplies the plate and filament currents for the amplifier tubes. For this purpose the output of transformer 323, as shown in FIG. 35, first passes through a rectifier tube 362 and then through the voltage regulator 363 and from thence to the plates of the amplifier tubes. An additional secondary 364 for transformer 323 may be employed to supply filament current to the various tubes.

The coil 368 of the pick-up at station 5 feeds its output voltage to a calibration potentiometer 365 corresponding to potentiometer 329 which modifies the voltage so that the meter relay 265 will read directly in units of the unbalance. The potential thus obtained is amplified, filtered and further amplified, and then passed to rectifier 366, corresponding to rectifier 336, previously described.

The rectified potential from rectifier 366 is imposed upon the coil of voltmeter relay 265 which has a needle 367 connected to the negative side of its coil by a suitable lead. A tolerance limit contact 369 adjustably is disposed to be engaged by the needle 367 when the latter reaches the position in its movement corresponding to the predetermined tolerance limit for unbalance in the workpiece.

Contact of needle 367 with tolerance limit contact 369 establishes a circuit through the control tube 370 that effects de-energization of relay 371 and closing of its normally open contacts 371–1 in line L61 and tripping of the reject gate 266.

Control tube 370 receives its plate current supplied from transformer 324 in line L6, the current passing first through a rectifier tube 372 and also through the coil of relay 371.

Returning to the control circuits of FIGS. 36 to 38, closing of switch 319 also supplies current to rectifier 373 in line L11 which in turn energizes the coil of brake 123 in line L14 through the initially closed timing contacts 374 on drum 157, and the coil for a brake 188 in line L17 on the output shaft of feed motor 187.

Closing of switch 319 also energizes time delay relay 375 in line L7 which times a warm-up period for the several electronic circuits and then closes relay contacts 375–1 in line L9 to energize an amber signal light 376 in line L8, indicating that the circuits are ready.

Manual closing of start button 377 in line L9 thereupon energizes relay 378 in the same line through contacts 375–1 and the normally closed emergency stop button 379.

Energization of relay 378 closes the contacts 378–1 feeding current to the main belt drive motor 121 for rotating the workpieces at stations 2 and 5, from power lines 314 through circuit breaker 316. Motor 121 is energized continuously throughout the operation of the machine and is only shut down in the event of an emergency by actuating stop button 379.

Energization of relay 378 also closes contacts 378–2 in line L10 which establishes a holding circuit for the relay by-passing the start button 377 in line L9.

Manual closing of the start button 377 also energizes a relay 380 in line L10 and which is also held in circuit by closing of holding contacts 378–2 in line L10.

Energization of relay 380 closes relay contacts 380–1 in vertical lead line 317 between lines L17 and L18 to connect the several control circuits to the secondary of supply transformer 315.

The cycle operation of the machine is thereupon started by turning the cycle start switch 381 in line L19 to start position where it closes a circuit through the normally closed contacts 382–1 in line L19 of relay 382 in line L39 and the loading station 1 limit switch 383 to the coil of relay 384, all in line L19.

If no workpiece 13 is positioned at station 1 the limit switch 383 remains open and no cycling of the machine occurs. However, as soon as a workpiece 13 arrives at station 1 it engages and closes limit switch 383 to thereupon close the circuit for relay 384.

Energization of relay 384 in line L19 effects closing of contacts 384–1 connecting the cam control drive motor 301 to the power lines 314 through closed circuit breaker 316. At the same time contacts 384–2 in line L15 are opened to release brake 158 for motor 301.

Starting of the motor 301 drives the timing drum 157 and immediately closes timing switch 385 in line L18 to maintain motor 301 in operation for a full cycle of one station and until the workpiece 13 is transferred from station 1 to station 2. Thereupon the motor 301 will stop unless the next succeeding workpiece has previously arrived at station 1 and closed limit switch 383.

The machine is intended to receive a continuous succession of workpieces and it will be assumed in the following description that successive workpieces 13 will arrive at station 1 in time to maintain the circuit for motor 301 by closing limit switch 383 during the time when timing switch 385 is open between the end of one station cycle and the beginning of the next station cycle. Timing drum 157 is driven to make one revolution for each station cycle which includes the longest time for all operations at any station and for the transfer of all workpieces to the next corresponding station.

For convenience of the present description and without intending to limit the same in any way, it will be assumed that a station cycle as above defined corresponds to approximately twenty-two seconds, the design time for the machine illustrated. With this assumption the various operations and their timing are recorded in FIG. 31.

Also for convenience of description, it will be assumed that unless otherwise stated there is a workpiece 13 at each station 1 to 5, inclusive.

The timing contacts 385 will close at approximately two-tenths of a second after start of drum 157 and will remain closed throughout the one revolution of the drum except for an allowance of about one-tenth of a second for stopping the drum at the end of the cycle.

The marker cam 95 actuates stamp die 82 from ink pad 81 to the shaft of workpiece 13 at station 1 to place a black mark thereon for angle indexing. This actuation may occur any time during the station cycle prior to transfer of the workpiece from the station. The time chart in FIG. 31 shows the actuation of stamp 82 to begin approximately two and two-tenths seconds after starting of drum 157 and to end with the stamp back on pad 81 in about four seconds thereafter. This completes the operations at station 1 and the workpiece thereupon awaits transfer to station 2.

Timing contacts 386 on drum 157, shown in line L12 of FIG. 36, will be closed at approximately four-tenths of a second after starting of the drum and will stay closed for approximately eight and two-tenths seconds. At the same time and for the same time period timing contacts 374 on drum 157, shown in line L14 of FIG. 36, will be opened.

Closing of contacts 386 energizes the coil for closing clutch 122 in line L12 to drive belt 21 from motor 121, and opening of contacts 374 for the same time period disconnects the coil for brake 123 to release the latter. At the end of the time period stated the contacts 386 open and contacts 374 close thereby opening clutch 122 and applying brake 123 to stop belt 21. A period of approximately one and six-tenths seconds is provided upon closing of clutch 122 for acceleration of the workpieces 13 at both stations 2 and 5 to the desired speed of rotation, and another one and six-tenths seconds are provided for deceleration after applying brake 123.

Belt lifter cam 146 actuates the belt lifter mechanism to lower belt 21 onto the shafts of the workpieces at stations 2 and 5 just before the actuation of contacts 386 and 374 by rotation of drum 157, and to raise the belt 21 off from the shafts sometime before the lifting of the workpieces 13 in transferring the same to the next station.

At the time the belt lifter mechanism lowers pulleys 127 to lower belt 21 upon the shafts of the workpieces 13 at stations 2 and 5, the belt 120 is driven by pulley 150 to actuate the stroboscope carriage 103 to move housing 106 over the forward end of the shaft of workpiece 13 at station 2.

If no workpiece is at station 5 as when the first, second and third workpieces of a run are at station 2, the loop 126 of belt 21 at station 5 merely runs over the idler lifter pulleys 127. The same is true as to the loop 126 and idler pulleys 127 at station 2 when clearing the machine after the last workpiece has been transferred from station 2. The same is true with respect to both loops 126 when no workpiece is in station 2 and station 5, and the first workpiece of a run is at station 1 being marked.

The brake cam 300 actuates the brake mechanism to release cradles 19 and 26 for free vibration in response to unbalance in the corresponding workpieces 13 as the latter reach the desired speed of rotation, and to brake the cradles against vibration again as the workpieces decelerate. The brakes are retained on at all other times in the station cycle.

Timing contacts 387 on drum 157, also shown in line L22 of FIG. 37, are closed at approximately two and one-tenth seconds after starting of drum 157 and continue closed only for about three-tenths of a second. Closing of timing contacts 387 energizes relay 388 in line L22 which in turn effects energization of the stroboscope lamp 107 by opening the contacts 388–1, see FIG. 32.

Energizing of relay 388 also closes the circuit to the photo-tube 108 by closing contacts 388–2, see FIG. 34.

Returning to the control circuits of FIGS. 36 to 38, energization of relay 388 also closes the contacts 388–3 in line L24 to set up a circuit through contacts 361–1 to relay 389.

Timing contact 390 on drum 157, shown in line L25 of FIG. 37, is closed about one-tenth of a second after closing of timing contacts 387 and stays closed for about six and four-tenths seconds as shown in the timing chart, FIG. 31.

Closing of contacts 390 effects forward drive of the angle motor 111 in line L30 shortly after energization of strobe lamp 107 and closing of the circuit to photo-cell 108 by closing of timing contacts 387.

For this purpose, if at the time the timing contacts 390 are closed by rotation of drum 157, the photo-tube 108 is receiving reflected light from the flashing lamp 107, indicating that the black mark 17 does not register with the light beam, the contacts 361–1 in line L24 will be closed thereby energizing relay 389. Under these conditions the contacts 389–1 in line L27 will be closed thereby energizing the time delay relay 391 which thereupon closes contacts 391-1 in line L28 and energizes the angle motor 111 for forward drive. At the same time contacts 391–2 in line L29 open to release the braking of the motor 111.

Contacts 391–3 in line L26 closes to energize time delay relay 392 through closed contacts 389–1 in line L27, normally closed contacts 382–2 in line L25 and the timing contacts 390. Energization of relay 392 opens contacts 392–1 in line L25 to prevent energization of time delay relay 393 upon closing of the normally closed contacts 389–2 in line L25 (presently kept open by energization of relay 389). Contacts 391–4 in line L25 are normally closed and are opened during energization of relay 391 to have the same effect.

If at the time the timing contacts 390 are closed by rotation of drum 157 the photo-tube 108 is not receiving reflected light from the flashing lamp, indicating that some part of the black mark 17 is registering with the light beam, relay 389 remains de-energized and its contacts 389–1 in line L27 remain open and its contacts 389–2 in line L25 remain closed.

The time delay relay 393 in line L25 is thereupon energized through timing contacts 390, normally closed contacts 382–2, normally closed contacts 389–2, normally closed contacts 391–4 and normally closed contacts 392–1.

Energization of relay 393 closes its contacts 393–1 in line L26 to thereby close a circuit to the time delay relay 391 in line L27. Contact 391–4 thereupon opens to de-energize relay 393, and the delayed opening of contacts 393–1 is set to hold the same closed until the angle motor 111 has rotated housing 106 sufficient to remove black mark 17 from interfering with the reflection of light to photo-cell 108. Thereupon contacts 361–1 close and relay 389 is energized to close contacts 389–1 and maintain relay 391 energized and the drive for motor 111.

Contacts 391–3 in line L26 are closed and time delay relay 392 is energized to hold open contacts 392–1 to maintain relay 393 de-energized. The contacts 392–1 holds the circuit open for relay 393 by timing closed after relay 391 is de-energized and until timing contacts 390 open.

Relay 391 is maintained energized to keep its contacts 391–1 closed and drive motor 111 forward until the reflection of light to photo-tube 108 is stopped by the approaching edge of black mark 17. Upon interruption of the light beam by the approaching edge of black mark 17, the contacts 361–1 open and de-energize relay 389 which thereupon opens contacts 389–1 and de-energizes relay 391.

De-energization of relay 391 closes contacts 391–2 in line L29 to apply a dynamic braking for motor 111 during a delayed opening of contacts 391–1.

De-energization of relay 391 also opens its contacts 391–5 in line L21 which served during forward drive of angle motor 111 as a holding circuit bypassing timing contacts 387 in line L22 to maintain relay 388 energized. The consequent de-energization of relay 388 closes contacts 388–1 and opens contacts 388–2 (see FIGS. 32 and 43) and thereby de-energizes the strobe lamp 107 and disconnects the photo-tube 108.

The angle motor 111 is returned to starting position for the next station cycle by reversing the same to prevent winding up of leads 114. For this purpose the timing contacts 394 in line L31 are closed by rotation of drum 157, shown to occur approximately sixteen and eight-tenths seconds after starting of drum 157. The contacts 394 continue closed for about six and four-tenths seconds. During this time the strobe carriage 103 is retracted and the workpiece 13 is transferred from station 2 and replaced by the next successive workpiece. At the end of the station cycle the strobe-carriage is again being moved into place by belt 120 as previously described.

Closing of timing contacts 394 in line L31 completes a circuit for time delay relay 395 through the normally closed limit switch contacts 396.

Energization of time delay relay 395 closes the contacts 395–1 in line L30 to provide a reverse drive connection for motor 111. At the same time the normally closed contacts 395–2 in line L29 are opened to release the dynamic braking circuit for the motor.

Motor 111 drives housing 106 in reverse until a lug 397 on a gear 398 driven from a corresponding gear 399 on the outer end of shank 110 in switch housing 115 engages limit switch 396 and opens the same to de-energize relay 395 and disconnect leads 116 to motor 111. Limit switch 396 is closed during the next forward drive of motor 111 by the movement of lug 397 away from the switch.

Upon opening of limit switch 396 the relay 395 is de-energized and contacts 395–2 close immediately to dynamically brake motor 111 before contacts 395–2 effect a delayed opening.

After the angle of unbalance is determined relative to the black mark 17 on the workpiece by forward rotation of motor 111 until the approaching edge of the mark prevents reflection of light to photo-tube 108, and after rotation of the workpiece 13 at station 2 has stopped by opening of timing contacts 386 to clutch 122 and closing of timing contacts 374 to the brake 123, the workpiece is indexed by the index motor 154, see line L34 of FIG. 37.

For this purpose the timing contacts 400 in line L32 are closed by rotation of drum 157 at about ten and two-tenths seconds after start of the drum or station cycle and remain closed approximately four-tenths of a second.

Closing of timing contacts 400 energizes relay 401 which closes the normally open contacts 401–1 in line L33 and energizes the relay 402 in the oscillator of FIG. 32, to effect a change of grid connections for the tube 351.

Energization of relay 401 opens contacts 401–2 in line L14 to de-energize the brake 123 for the drive of belt 21.

Energization of relay 401 closes contacts 401–3 in line L34 to supply current to the index motor 154 and drive the latter forward and thereby drive the workpiece 13 slowly through belt 21.

Energization of relay 401 also closes contacts 401–4 in line L23 which energizes relay 388 to close contacts 388–3 in line L24 to set up a circuit to relay 389 through contacts 361–1 which are ordinarily closed at that time. At the same time relay 388 closes contacts 388–1 and 388–2 to energize strobe lamp 107 and connect photo-tube 108 in circuit as shown in FIGS. 32 and 34.

Timing contacts 403 in line L35 are closed by rotation of drum 157 at approximately three-tenths of a second after contacts 400 are closed and one-tenth of a second before opening of contacts 400. Contacts 403 remain closed for approximately six and one-half seconds during which time relay 404 in line L35 is energized thereby. Energizing of relay 404 closes contacts 404–1 in line L33 ahead of the jumper 405 between lines L32 and L33 to make ready a holding circuit for relay 401 as described hereinafter.

Energization of relay 404 also closes contacts 404–2 in line L36 to energize the index finding circuits contained in lines L36, L37 and L38.

If relay contacts 361–1 in line L24 are open indicating that the photo-tube 108 is dark and viewing only black mark 17, and relay 389 is de-energized, the normally closed contacts 389–3 in line L36 energize time delay relay 406.

Energization of the time delay relay 406 closes contacts 406–1 in line L37 which then energizes relay 407 in line L38 through jumper 408 between lines L37 and L38.

Energization of relay 407 closes contacts 407–1 in line L33 to complete the holding circuit for relay 401 through jumper 405 before timing contacts 400 open. Energization of relay 407 opens contacts 407–2 in line L14 to retain the brake 123 released. Energization of relay 407 opens contacts 407–3 in line L36 to de-energize time delay relay 406.

The contacts 406–1 hold closed and delay in opening upon de-energization of time delay relay 406 until the belt 21 drives workpiece 13 far enough to remove mark 17 from interference with reflection of light to phototube 108, whereupon contacts 361–1 close energizing relay 389. Energization of relay 389 closes contacts 389–4 in line L38 to continue the energization of relay 407.

Energization of relay 407 also closes contacts 407–4 in line L37 which effects energization of the time delay relay 409 and thereby opens contacts 409–1 in line L36 to lock out relay 406 until after relay 407 is de-energized and relay 401 is dropped out to stop index motor 154.

When the index motor 154 has rotated the workpiece 13 to a point where the approaching edge of black mark 17 interrupts the reflection of light to photo-tube 108 contacts 361–1 open de-energizing relay 389, which in turn opens contacts 389–4 in line L38 to de-energize relay 407. De-energization of relay 407 opens contacts 407–1 in line L33 and de-energizes relay 401.

Contacts 401–2 and 407–2 in line L14 close the circuit to apply brake 123 to the drive for belt 21. Contacts 401–3 in line L34 open to stop index motor 154. Contacts 401–4 in line L23 open to de-energize relay 388 which in turn opens contacts 388–3 in line L24 to de-energize the relay 389. Contacts 388–1 close and contacts 388–2 open to de-energize the strobe lamp 107 and disconnect the photo-tube 108, respectively.

Finally timing contacts 403 in line L35 open and de-energize relay 404 to open contacts 404–2 in line L36 and de-energize the index finding circuit, thereby making the control ready for the next station cycle.

If, at the time contacts 403 close to energize relay 404 the contacts 361–1 are closed, indicating that photo-tube 108 is receiving reflected light, relay 389 is energized. Under these conditions contacts 389–4 in line L38 close immediately to energize relay 407. At the same time contacts 389–3 and 407–3 in line L36 open to prevent energization of time delay relay 406.

Contacts 407–1 in line L33 close to maintain relay 401 energized. Also, contacts 407–2 in line L14 open to prevent actuation of brake 123.

When motor 154 drives the workpiece 13 until the black mark 17 interferes with the reflection of light to photo-tube 108, relay contacts 361–1 open and de-energize relay 389. Contacts 389–4 in line L38 then open and de-energize relay 407 which thereupon opens contacts 407–1 and de-energizes relay 401. Contacts 401–2 and 407–2 in line L14 close to apply brake 123 and stop further rotation of the workpiece.

Contacts 401–3 in line L34 open to de-energize the index motor 154. Contacts 401–4 in line L23 open to de-energize relay 388, thereby also opening contacts 388–3 in line L24 and de-energizing relay 389. Contacts 388–1 close and contacts 388–2 open to de-energize the strobe lamp 107 and disconnect the photo-tube 108, respectively.

The parts are thereby restored to start position ready for the next station cycle. The workpiece is indexed angularly relative to the intended point of unbalance correction.

Timing contacts 410 shown in line L39 of FIG. 37 are closed at approximately two seconds after the start of drum 157 or of a station cycle, as shown in the chart FIG. 31, and continue closed for approximately five and two-tenths seconds to control the measuring of unbalance of the workpiece at station 2.

If unbalance in the workpiece is less than one-half of the minimum strip length both contacts 341–1 and 342–1 remain open and nothing is energized for the given station cycle and no strip stock 22 is fed to shear 204.

If unbalance in the workpiece exceeds one-half of the minimum strip length, relay contacts 342–1 in line L41 close to energize relay 411.

Energization of relay 411 closes the normally open contacts 411–1 in line L40 to energize time delay relay 412 through normally closed contacts 413–1. A jumper 414 between lines L40 and L41 gives contacts 411–1 control over energization of relays 411 and 412 as against contacts 342–1.

With time delay relay 412 energized, normally closed contacts 412–1 in line L46 open to remove the dynamic brake circuit for the weighing motor 182, and the normally open contacts 412–2 in line L45 close to drive weighing motor 182 forward. Forward rotation of motor 182 adjusts the potentiometer 181 until an equal and opposite amplified potential to that from the pick-up coil 101 is impressed upon voltmeter relay 180 to bring its needle 338 back to the zero contact 339. At the zero contact point 339 where the voltage of potentiometer 181 nullifies the unbalance voltage signal from the rectifier 336 relay 341 is de-energized to close contacts 341–1 while contacts 342–1 remain open.

Closing of contacts 341–1 in line L42 energizes relay 413 through the contacts 411–2 which have been closed by energization of relay 411, as previously described. The normally closed contacts 413–1 in line L40 are thereupon opened to de-energize time delay relay 412. Contacts 413–2 in line L43 provide a holding circuit for relay 413 around contacts 341–1.

When relay 412 is de-energized its contacts 412–1 in line L46 are closed to apply dynamic braking to weighing motor 182. After a predetermined time delay for stopping of the motor contacts 412–2 in line L45 open to cut off all power to motor 182 and also to its dynamic brake circuit.

If in the course of the measuring or weighing of the amount of unbalance the rotation for the motor 182 and its measuring cam 186 would exceed the maximum permissible strip length for mass 24, the limit switch 184 in line L51 closes to energize relay 415 and close a holding circuit therefor bypassing switch 184 and containing contacts 415–1 in line L52.

At this time contacts 415-2 in line L53 are opened by relay 415 to lock out relay 416, as later explained. Contacts 415-3 in line L44 close to provide a circuit for relay 413.

The return of motor 182 and the potentiometer 181 to starting position is effected by timing contacts 417 in line L48 FIG. 37 which are closed by drum 157 at any time after timing contacts 410 open, and remain closed for about five and two-tenths seconds to open before timing contacts 410 close for the next station cycle.

Closing of contacts 417 in line L48 energizes time delay relay 418 which opens the normally closed contacts 418-1 in line L46 to remove any dynamic braking of motor 182, and closes the normally open contacts 418-2 in line L47 to apply a reverse drive for motor 182.

When limit switch 183 in line L48 is opened by the motor 182 returning the potentiometer 181 to zero position, the relay 418 is de-energized. Thereupon contacts 418-1 in line L46 close to apply dynamic braking to motor 182, and after a predetermined time delay to effect stopping of the motor the contacts 418-2 in line L47 open to cut off current from the motor and its braking circuit.

During energization of relay 418 the normally closed contacts 418-3 in line L51 are open to prevent energization of relay 415.

The feeding of the strip 22 to shear 204 is accomplished by the feed motor 187 under the control of timing contacts 419 in line L53 of FIG. 58 which are closed by drum 157 as timing contacts 410 open, at approximately seven and two-tenths seconds after starting of the drum cycle as shown on time chart FIG. 31. Contacts 419 remain closed for approximately three and two-tenths seconds.

Closing of contacts 419 in line L53 energizes the circuit for relay 416 through the normally closed limit switch 201, provided that the normally closed contacts 415-2 have not been opened to indicate that a longer mass 24 is required than the maximum stock cut of the machine, and provided further that contacts 420-1 are closed by relay 420 in line L49, indicating that some mass 24 is required.

For this latter purpose relay 420 becomes energized upon closing of contacts 342-1 in line L41 energizing relay 411 and thereby closing contacts 411-1 in line L40 to energize time delay relay 412 and close its contacts 412-3 in line L49 leading to relay 420. Upon energization of relay 420, its contacts 420-2 in line L50 close to establish a holding circuit therefor bypassing contacts 412-3 and maintaining relay 420 energized after timing contacts 410 and 417 are opened.

If upon closing of timing contacts 419 the relay 416 is energized, as would normally occur, contacts 416-1 in line L17 open to de-energize the brake 188 for the strip measuring or feed motor 187 and contacts 416-2 in the power circuit close to drive feed motor 187 forwardly from power lines 314 through circuit breaker 316.

When the limit switch 201 in line L53 is opened by touching the measuring cam 186, relay 416 is de-energized, and the contacts 416-2 open to de-energize motor 187. Contacts 416-1 close to set the brake for motor 187.

Timing contacts 421 in line L55 are closed at approximately fourteen seconds after the start of drum 157 or of the station cycle as indicated in the time chart of FIG. 31, and is held closed for approximately three and two-tenths seconds to return the strip feed motor 187 to start position.

Closing of timing contacts 421 in line L55 energizes relay 422 which in turn opens contacts 422-1 in line L49 to de-energize relay 420 and also relay 415.

Contacts 422-2 in line L54 close to energize relay 423 which closes the reverse drive contacts 423-1 in the power circuit for the strip feed motor 187. At the same time contacts 423-2 in line L17 open to release the brake 188.

At the motor 187 approaches the zero starting point the normally closed contacts of limit switch 203 in line L54 are opened, thereby de-energizing, relay 423, opening contacts 423-1 and closing contacts 423-2.

Thereupon timing contacts 421 open and de-energize relay 422 closing its contacts 422-1 in line L49 and opening its contacts 422-2 in line L54.

The shearing of the strip to provide correction mass 24 is taken care of immediately following the strip measuring operation just described. Cam 218 actuates the shear as previously described.

The transfer head 222 receiving the correction mass 24 is carried from the shear 204 around on feeder wheel 223 in separate increments of one-eighth revolution each, as previously described until the correction mass registers with the opening 226 in between the welding tongs 225. The poker 227 thereupon pushes the correction mass into the groove 226 and retracts, as previously described. The welding tongs then advance under the influence of welder cam 258.

The welding operation is controlled by timing contacts 424 in line L56 which are closed by drum 157 upon movement of the tongs 255 downward into welding position, shown on the time chart of FIG. 31 as approximately ten and two-tenths seconds after starting of drum 157 or the beginning of the station cycle. Contacts 424 are retained closed for one and three-tenths seconds, which is generally sufficient time to complete the welding of correction mass 24 to vane or blade 25.

Referring to FIG. 38, closing of timing contacts 424 in line L56 energizes the welding relay 425 in the welder control panel and the welder thereupon follows through automatically in sequence to apply pressure and welding current to the work from the welding transformer.

Upon opening of timing contacts 424 the welding relay 425 is de-energized and the welder is returned to start ready for the next station cycle.

At station 5 the workpiece 13 is inspected to determine whether the unbalance remaining therein may exceed a predetermined tolerance limit for unbalance.

For this purpose timing contacts 426 in line L57 of FIG. 38 are closed by drum 157 to set up a circuit for relay 427 in line L57. The time chart of FIG. 31 shows the closing of contacts 426 to occur approximately eight seconds after the start of drum 157 or of the station cycle, and to continue only for about six-tenths of a second.

After closing of timing contacts 426 in line L57, if the workpiece 13 is within the tolerance limit for unbalance the meter needle 367 fails to engage contact 369 and nothing happens to set in motion the reject mechanism. The workpiece is then transferred to station 6 and rolls out on the outgoing conveyor rails 27.

If the workpiece at station 5 has an unbalance exceeding the tolerance limit, needle 367 engages contact 369 and thereby energizes relay 371 which closes contacts 371-1 in line L61 to energize relay 428.

Energization of relay 428 closes its contacts 428-1 in line L57 and thereupon completes the circuit for relay 427 through the closed timing contacts 426.

Energization of relay 427 closes its contacts 427-1 and 427-2 in line L58 to energize the latch solenoid 267 and release the reject gate 266 at station 6.

Energization of relay 427 also closes contacts 427-3 in line L59 to energize relay 429, which in turn closes contacts 429-1 in line L60 to energize a reject signal such as light 430, where desired.

When timing contacts 426 open and relay 427 is de-energized relay 429 is de-energized, but its time delay contacts 429-1 remain closed until after timing contacts 426 close in the next station cycle, so that a continuous flow of reject workpieces will keep the signal 430 continuously energized to indicate that a major error is occurring. Automatic shut-down of the machine may be provided by a time delay switch, not shown, responsive to the energization of the signal.

An emergency stop button 379 is disposed adjacent the start button 377 in line L9 for emergency manual stopping of the machine. Actuation of stop button 379 will stop all motors, set the brakes and de-energize the control so that the cycle stops at that point. All parts in process at the time of stop should be checked and the cycle can only be started again by pushing the start button 377.

When a run is ended and the last workpiece has arrived at station 2, the absence of a workpiece at station 1 will allow limit switch 383 to open at the end of the station cycle and the machine will stop with workpieces in the other stations. To clear the machine of workpieces the clear machine button 432 in line L20 is pressed to bypass limit switch 383 and continue the operation of the machine as long as the button is pressed.

For normal stopping of the machine as for short recess periods it is only necessary to turn the cycle switch 381 in line L19 to stop position.

While the timing and the control circuits have been described in detail for the embodiment illustrated, it will be understood that various time cycles and correlations of movements may be utilized or obtained. Station 3 may be eliminated where the correction does not require an index shift of the workpiece for practical application of the correction step. Various additional stations may be employed if desired.

The machine is fully automatic after starting and can be made to signal where any error is occurring that needs attention. For instance, the inspection station may employ a monitoring system such as that set forth in the copending application Serial No. 514,961, filed June 13, 1955, by Robert J. Fibikar, one of the present joint inventors, now Patent No. 2,986,920. The tolerance limit calibration may also be made in accordance with the foregoing application. For this purpose a calibration connection 433 may be provided in line L39 to energize relay 382. Energization of relay 382 opens its normally closed contacts 382–1 in line L19 and 382–2 in line L25 to prevent start of the machine cycle.

Turning of switch 433 to calibration position wherein relay 382 is energized, effects opening of contacts 382–1 (FIG. 37) in line L19 causing relay 384 to be de-energized and thereby opening contacts 384–1 and de-energizing control drive motor 301. At the same time, energization of relay 382 opens contacts 382–2 in line L25 (FIG. 37) to disconnect the several relays 391, 392 and 393 and motor 111 constituting the circuit for determining angle of unbalance and indexing the workpiece. This permits independent rotation of the workpiece for calibration and setup purposes.

The several mechanical cam and belt drives are constructed to be timed in correlation with the timing of drum 157.

The machine may be constructed to provide two plane correction for dynamic unbalancing by adding additional unbalance measuring and correcting stations and employing suitable additional control timing circuits.

Where two plane correction is employed as in dynamic balancing, stations 2, 3 and 4 will be duplicated so that each set will measure, index and correct for unbalance as to a separate transverse plane of the workpiece 13. As explained above, where re-index is not needed, station 3 may be eliminated, in which case only stations 2 and 4 need be duplicated for two plane correction. If the re-index station 3 is needed in two plane correction of a given type of workpiece, the station should be duplicated with the actuation of each adjusted for the correction location required in the corresponding plane.

For this purpose FIG. 39 illustrates the cradle support for the workpiece at stations 2 and 5 and at the additional station that duplicates station 2. The cradle 434 is suspended from bracket 99 by means of wires 435 at opposite corners of the cradle and which leave the cradle free to oscillate in a horizontal plane in response to unbalance in the rotary workpiece 13.

Two arms 436 and 437 spaced axially of the workpiece depend from cradle 434 through openings in the top plate 14 and carry separate horizontal pick-up rods 438 and 439 respectively. A pick-up coil 440 is disposed on the free end of rod 438 and operatively between the opposite poles of a permanent magnet, similar to magnet 102, previously described. Likewise, a pick-up coil 441 is disposed on the free end of rod 439 and operatively between the opposite poles of a permanent magnet.

The coils 440 and 441 generate voltage pulses in response to vibrations of the corresponding ends of the workpiece. At station 2 only coil 440 is employed to feed pulses into the electronic amplifying and metering circuits in place of coil 101 in FIG. 32. At the station duplicating station 2 only coil 441 is employed to feed pulses into the electronic amplifying and metering circuits in place of coil 101 in FIG. 32.

The duplicate stations referred to will require a corresponding lengthening of the transfer mechanism 8 with an additional set of grippers 42 for each station, the duplicate additional stations being disposed between station 4 and station 5, previously described, as shown in FIG. 40.

In FIG. 40 the duplicate stations are those indicated as for correction plane No. 2. An additional belt loop 126 is provided for the first of these stations with a belt lifter as previously described for station 2. Likewise, an additional welder mechanism 10 is provided for the last of these stations, as previously described for station 4. The correction at each respective correction station will be applied to the workpiece in the corresponding correction plane.

Suitable control circuit duplications and additions will be necessary for FIGS. 36 to 38 to operate the duplicate stations simultaneously with the stations 2, 3 and 4. Likewise, the time cycle chart, FIG. 31, will have added thereto a duplicate of the controls indicated as section No. 2 so that section No. 2 may serve for correction plane No. 1 and the duplicate section will serve for correction plane No. 2.

The inspection station 5 inspects for unbalance in each of the two planes of correction. For this purpose the circuit of FIG. 42 is substituted for the pickup coil 368 and calibrating potentiometer 365 in FIG. 35. The pick-up coils, 440 and 441 at the inspection station, as shown in FIG. 42 feed into a suitable calibrating network system, as set forth in the Baker Patent No. 2,165,024, through corresponding sets of normally open contacts 442 and 443 on the input side, and corresponding sets of normally open contacts 444 and 445 on the output side leading to the amplifier tubes and rectifier 366 in FIG. 35.

For the purpose of controlling the inspection for two plane inspecting, the circuit of FIG. 38 is modified as indicated in FIG. 41, and the time cycle chart, FIG. 31, will have its inspection section modified as indicated at the bottom of the chart.

Referring to the modified time cycle as shown for section No. 3 of FIG. 31, it will be noted that in place of timing contacts 426 in section 3 of the chart, a timing contact 446 is provided for the control of inspection for corection plane No. 1 and a timing contact 447 is provided for the control of inspection for correction plane No. 2. The contacts 446 and 447 are closed sequentially by drum 157 during the rotation of the workpiece at the inspection station.

Referring to the control circuit of FIG. 38 as modified by FIG. 41, line L57 is abolished and lines L62, L63, L64, L65 and L66 are substituted therefor.

Referring to the inspection circuit of FIG. 35 as modified by FIG. 42, the coil 368 is replaced by the two coils 440 and 441, one for each correction plane, and the calibrating potentiometer 365 is replaced by the network of FIG. 42.

After the workpiece 13 is brought to rotary speed at the inspection station, drum 157 closes the timing contacts 447 in line L66 of FIG. 41, at approximately three seconds after start of the drum or of the station cycle, and these contacts are retained closed for approximately two and six-tenths seconds, whereupon they open. At approximately six seconds after start of drum 157 or of the station cycle, timing contacts 446 in line L62 of FIG. 41 close and stay closed for approximately two and six-tenths seconds.

When contacts 47 close as just described they energize the time delay relay 448 in line L66 which in turn closes the four contacts 443 and the two 445 in FIG. 42 to feed the pulses from inspection coil 441 for unbalance in plane No. 2 to the inspection circuit.

Energization of relay 448 closes the sets of contacts 443 and 445 of FIG. 42 thereby feeding the inspection pulses of coil 441 through the network into the inspection circuit as shown beginning with amplifier tubes and rectifier 366 of FIG. 35.

If the workpiece is within the tolerance limit for unbalance at correction plane No. 2 the meter needle 367 fails to engage contact 369 and nothing happens to set in motion the reject mechanism.

If the workpiece at the inspection station has an unbalance at plane No. 2 exceeding the tolerance limit, needle 367 engages contact 369 and thereby energizes relay 371 which closes contacts 371–1 in line L61 to energize relay 428 and initiate actuation of reject gate 266, as previously described.

Energization of relay 428 closes its contacts 428–1 in lineline L64, and since contacts 448–1 in line L65 are closed by relay 448 the relay 427 in line L64 is energized.

Energization of relay 427 closes its contacts 427–1 and 427–2 in line L58 to energize the latch solenoid 267 and release the reject gate 266 at the unload station.

After drum 157 opens timing contacts 447, closing of timing contacts 446 in line L62 of FIG. 41 initiates the inspection for correction plane No. 1. For this purpose closing of contacts 446 energizes relay 449 in line L62 which in turn closes the sets of four contacts 442 and two contacts 444 in the network of FIG. 42 to apply pulses from pick-up coil 440 for unbalance in plane No. 1 to the inspection circuit of FIG. 35.

If the workpiece is within the tolerance limit for unbalance at corection plane No. 1, the meter needle 367 fails to engage contact 369 and nothing happens to set in motion the reject mechanism. If the reject mechanism has not been actuated at that time by the inspection for correction plane No. 2, the workpiece is then transferred to the unloading station and rolls out on the outgoing conveyor rails 27.

If the workpiece at the inspection station has an unbalance at plane No. 1 exceeding the tolerance limit, needle 367 (FIG. 35) engages contact 369 and thereby energizes relay 371 which closes contacts 371–1 in line L61 (FIG. 41) to initiate actuation of the reject gate 266 (FIGS. 4, 28 and 29), as previously described.

Closing of contacts 371–1 energizes relay 428 (FIG. 41) which closes contacts 428–1 in line L64 and closes the circuit for reject relay 427 through the then closed contacts 449–1 in line L63.

When timing contacts 447 and 446 open, relay 427 is de-energized and the reject mechanism holds actuated until the workpiece is transferred from the inspection station and rejected.

The invention is applicable to various types of balance measuring and correcting within the scope of the accompanying claims. The unbalance measuring may employ any suitable apparatus therefor, that illustrated constituting one type of suitable apparatus. Similarly, the correction may be made by drilling, grinding, and other means or by welding as illustrated.

Various modes of carrying out the invention are contemplated as being within the scope of the following claims particularly pointing out and distinctly claiming the subject matter which is regarded as the invention.

We claim:

1. In a machine of the class described having an unbalanced determining station comprising a support having bearings for receiving a shaft of the workpiece, means responsive to vibrations of said support in a given direction to determine the unbalance in the workpiece when the latter is rotated in said bearings, a belt for driving the workpiece and having a loop containing the shaft of the workpiece therein and having substantially parallel opposite courses extending from said shaft in a direction normal to the direction of free vibration of the support to avoid interference with the support vibrations by the belt, means to transfer the workpiece into and out of said bearings, a belt lifter having means to engage and lift the belt from the shaft of the workpiece and to withdraw the loop thereof axially from the end of the workpiece shaft to clear the same for transfer, and means to actuate said belt lifter in correlation to the transfer of successive workpieces into and out of the unbalance determining station.

2. The construction of claim 1 in which said belt lifter comprises a pair of idler pulleys mounted on adjacent pivotal arms and normally disposed side by side in the plane of the belt loop and within the loop, means to pivot said arms outwardly to spread the belt loop away from the workpiece shaft and to raise the pulleys and lift the belt from the shaft, means thereafter operative to pivot both arms as a unit on an axis substantially parallel to the plane of the belt loop and generally normal to the axis of the workpiece to carry the belt loop axially away from the end of the workpiece shaft, and means to reverse the action of the belt lifter in applying the belt loop to the shaft of the succeeding workpiece.

3. In a machine of the class described for automatically balancing successive like workpieces and in which workpieces are individually transferred thereto and therefrom in succession, an unbalance determining station at which means are provided to receive and rotate a workpiece and to translate vibrations produced by unbalance therein into electrical pulses, means responsive to said electrical pulses to determine the angular location of unbalance in the rotating workpiece and to thereafter index the workpiece for unbalance correction, said last named means including a stroboscopic angle determining apparatus and a carriage rotationally mounting said stroboscopic apparatus and movable axially of the workpiece to dispose said stroboscopic apparatus in operative position coaxial relative to the workpiece during rotation and indexing of the latter, and means to actuate said carriage to retract said stroboscopic apparatus from the workpiece and thereby permit transfer of a workpiece to and from said station.

4. In a machine for automatically balancing successive like workpieces, a cradle having bearings providing for the support of the workpiece with an end of the same extending beyond the cradle, a stroboscope lamp and a light pick-up means with both mounted on a carriage movable axially of the protruding end of the workpiece to a position where a surface of the workpiece reflects light from said lamp to said light pick-up means, means to move said carriage into and out of operative position for said lamp and light pick-up means, means to drive the workpiece, means to flash said lamp in correlation to the unbalance vibrations of said cradle during rotation of the workpiece, means to translate said lamp and light pick-up means about the axis of the workpiece until a mark on said reflecting surface of the workpiece registers a change in reflection of light from said lamp to said light pick-up means, and means thereafter to flash said lamp periodically and slowly turn said workpiece relative to the position of said lamp and light pick-up means until the same change in light reflection is obtained.

5. In a machine for automatically balancing successive like workpieces, means to support a workpiece for free rotation, means to load and unload successive workpieces into and out of said support means, a drive belt for engaging a workpiece to rotatably drive the latter, means operably correlated with said loading and unloading means to move said drive belt into driving engagement with the workpiece when the latter is loaded into said support means and to remove said drive belt therefrom for subsequent unloading of the workpiece, said last named means moving the belt from the path of movement of the workpiece in loading and unloading operations, means to determine the amount of unbalance in the workpiece while the latter is rotated on said support by said drive belt, and means actuating said several means in correlated time cycles for successive workpieces.

References Cited in the file of this patent
UNITED STATES PATENTS

| | | |
|---|---|---|
| 2,300,354 | Eddison | Oct. 27, 1942 |
| 2,382,843 | Annis | Aug. 14, 1945 |
| 2,492,092 | Bulliet | Dec. 20, 1949 |
| 2,524,650 | Cantle | Oct. 3, 1950 |
| 2,663,184 | Merrill et al. | Dec. 22, 1953 |
| 2,779,217 | Stovall et al. | Jan. 29, 1957 |
| 2,821,858 | King | Feb. 4, 1958 |

UNITED STATES PATENT OFFICE
CERTIFICATE OF CORRECTION

Patent No. 3,024,661            March 13, 1962

Robert J. Fibikar et al.

It is hereby certified that error appears in the above numbered patent requiring correction and that the said Letters Patent should read as corrected below.

Column 6, line 4, for "escapecent" read -- escapement --; column 8, line 68, for "stop" read -- stops --; column 12, line 44, strike out "instance"; column 14, line 30, for "line" read -- lines --; column 15, line 28, for "is" read -- it --; column 19, line 42, for "closes" read -- close --; column 20, line 1, for "holds" read -- hold --; line 21, for "43" read -- 34 --; line 53, for "395-2" read -- 395-1 --; column 22, line 73, for "close" read -- closes --; column 23, line 75, for "At" read -- As --; column 24, line 2, after "de-energizing" strike out the comma; column 27, line 13, for "47" read -- 447 --; line 34, for "lineline" read -- line --.

Signed and sealed this 10th day of July 1962.

(SEAL)
Attest:
ERNEST W. SWIDER
Attesting Officer

DAVID L. LADD
Commissioner of Patents